United States Patent
Bennett et al.

(10) Patent No.: US 8,813,869 B2
(45) Date of Patent: Aug. 26, 2014

(54) ANALYSIS REFRACTED ACOUSTIC WAVES MEASURED IN A BOREHOLE

(75) Inventors: Nicholas Bennett, Hamden, CT (US); Jakob Brandt Utne Haldorsen, Somerville, MA (US); Hiroaki Yamamoto, Kanagawa (JP); Nobuyasu Hirabayasbi, Kanagawa (JP); Takeshi Endo, Kanagawa (JP); Richard Timothy Coates, Middlebury, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 503 days.

(21) Appl. No.: 12/052,503

(22) Filed: Mar. 20, 2008

(65) Prior Publication Data

US 2009/0236145 A1 Sep. 24, 2009

(51) Int. Cl.
*E21B 44/00* (2006.01)
*G01V 1/40* (2006.01)
*E21B 47/022* (2012.01)
*G01V 1/50* (2006.01)
*E21B 7/04* (2006.01)

(52) U.S. Cl.
CPC .............. *E21B 7/04* (2013.01); *E21B 47/02208* (2013.01); *G01V 1/50* (2013.01)
USPC ............... 175/24; 175/40; 175/60; 175/61; 367/25; 367/31; 702/18; 166/250.01; 166/254.1; 166/254.2

(58) Field of Classification Search
CPC ....................................................... G01V 1/50
USPC .......... 175/24, 45, 50, 61, 73; 367/22–35, 57; 702/14, 18
See application file for complete search history.

(56) References Cited

U.S. PATENT DOCUMENTS

| 5,081,611 A | 1/1992 | Hornby |
| 5,113,953 A | 5/1992 | Nobel |
| 5,200,928 A * | 4/1993 | MacLeod ........................ 367/27 |
| 5,265,682 A | 11/1993 | Russell et al. |
| 5,520,255 A | 5/1996 | Barr et al. |
| 5,553,678 A | 9/1996 | Barr et al. |
| 5,553,679 A | 9/1996 | Thorp |

(Continued)

FOREIGN PATENT DOCUMENTS

| WO | 9727502 | 7/1997 |
| WO | 0003269 | 1/2000 |

OTHER PUBLICATIONS

Aron et al, "Sonic compressional measurements while drilling", SPWLA 35th Annual Logging Symposium, Jun. 19-22, 1994, 17 pages.

(Continued)

*Primary Examiner* — James Sayre
(74) *Attorney, Agent, or Firm* — Daryl R. Wright; Jody DeStefanis

(57) ABSTRACT

Methods and related systems are described for measuring and analyzing refracted acoustic energy. A plurality of receivers mounted are on a downhole tool, and are arranged and adapted to receive refracted acoustic energy from a downhole formation. Measurements of refracted acoustic energy is analyzed such that information relating to an azimuthal direction relative to the downhole tool of an interface within the downhole formation can be estimated. The receivers can be mounted on a drill collar as part of a LWD tool and steering of the drilling trajectory can be based in part on the estimated formation information.

63 Claims, 16 Drawing Sheets

(56) References Cited

U.S. PATENT DOCUMENTS

| | | | |
|---|---|---|---|
| 5,582,259 | A | 12/1996 | Barr |
| 5,603,385 | A | 2/1997 | Colebrook |
| 5,673,763 | A | 10/1997 | Thorp |
| 5,678,643 | A | 10/1997 | Robbins et al. |
| 5,685,379 | A | 11/1997 | Barr et al. |
| 5,695,015 | A | 12/1997 | Barr et al. |
| 5,706,905 | A | 1/1998 | Barr |
| 5,778,992 | A | 7/1998 | Fuller |
| 5,803,185 | A | 9/1998 | Barr et al. |
| 5,971,085 | A | 10/1999 | Colebrook |
| 6,084,826 | A | 7/2000 | Leggett, III |
| 6,089,332 | A | 7/2000 | Barr et al. |
| 6,092,610 | A | 7/2000 | Kosmala et al. |
| 6,158,529 | A | 12/2000 | Dorel |
| 6,244,361 | B1 | 6/2001 | Comeau et al. |
| 6,308,137 | B1 | 10/2001 | Underhill et al. |
| 6,364,034 | B1 | 4/2002 | Schoeffler |
| 6,394,193 | B1 | 5/2002 | Askew |
| 6,541,975 | B2 | 4/2003 | Strack |
| 6,581,010 | B2 * | 6/2003 | Dubinsky et al. ............... 702/9 |
| 6,594,584 | B1 | 7/2003 | Omeragic et al. |
| 7,027,927 | B2 | 4/2006 | Matsuoka et al. |
| 7,392,135 | B2 * | 6/2008 | Varsamis et al. ............... 702/1 |
| 7,558,153 | B2 | 7/2009 | Zeroug et al. |
| 2001/0052428 | A1 | 12/2001 | Larronde et al. |
| 2002/0011359 | A1 | 1/2002 | Webb et al. |
| 2006/0077757 | A1 * | 4/2006 | Cox et al. .................... 367/25 |
| 2007/0168133 | A1 | 7/2007 | Bennett et al. |

OTHER PUBLICATIONS

Arroyo et al, "Superior seismic data from the borehole", Oilfield Review, Schlumberger, Spring 2003, 22 pages.

Barkved et al, "The Many Facets of Multicomponent Seismic Data", Oilfield Review, Schlumberger, Summer 2004, 15 pages.

Brie et al, "Shear Sonic Interpretation in Gas-Bearing Sands", SPE30595, SPE Annual Technical Conference and Exhibition, Dallas, Oct. 1995, pp. 701-710.

Gelman et al, "Bayesian Data Analysis" Chapter 8, "Introduction to regression models", Chapman & Hall/CRC, Boca Raton, FL, 2000, pp. 233-237.

Hashem et al, "Seismic tie using sonic-while drilling measurements", SPWLA 40th Annual Logging Symposium, May 30-Jun. 3, 1999, 13 pages.

Brian Hornby, "Tomographic reconstruction of near-borehole slowness using refracted borehole sonic arrivals", Geophysics, vol. 58, No. 12, Dec. 1993, pp. 1726-1738.

Kimball et al, "Semblance processing of borehole acoustic array data", Geophysics, vol. 49, No. 3, Mar. 1984, pp. 274-281.

Li et al, "New directional electromagnetic tool for proactive geosteering and accurate formation evaluation while drilling", SPWLA 46th Annual Logging Symposium, Jun. 26-29, 2005, 16 pages.

Omeragic et al, "Real-time interpretation of formation structure from directional EM measurements", SPWLA 47th Annual Logging Symposium, Jun. 4-7, 2006, 14 pages.

Konstantin Osypov, "Robust refraction tomography", 70th Annual International Meeting, SEG, Expanded Abstracts, pp. 2032-2035.

Valero et al, "Improved first-motion algorithm to compute high-resolution sonic log", SPE 90995, 2004 SPE International Petroleum Conference in Mexico held in Puebla, Mexico Nov. 8-9, 2004, 7 pages.

Zelt et al, "Three-dimensional seismic refraction tomography: A comparison of two methods applied to data from the Faeroe Basin", Journal of Geophysical Research, vol. 103, No. B4, pp. 7187-7210, 1998.

Zeroug et al, "Monopole radial profiling of compressional slowness", SEG, 76th Annual Meeting, New Orleans, Louisiana, 2006.

Zhang et al, "Nonlinear refraction traveltime tomography", Geophysics, vol. 63, No. 5, Sep.-Oct. 1998, pp. 1726-1737.

Aki et al, "Quantitative Seismology Theory and Methods", vol. 1, 2nd Ed. ISBN 0-935702-96-2, pp. 403-445.

W.N. DeAmorim et al, "Computing Field Statics with the Help of Seismic Tomography", Geophysical Prospecting 35, (8), pp. 907-919, 1987.

Pistre et al, "Estimation of 3D Borehole Acoustic Rock Properties Using a New Modular Sonic Tool", Eagle 67th Conference and Exhibition, Madrid Spain, Jun. 13-16, 2005, pp. 2029-2032.

* cited by examiner

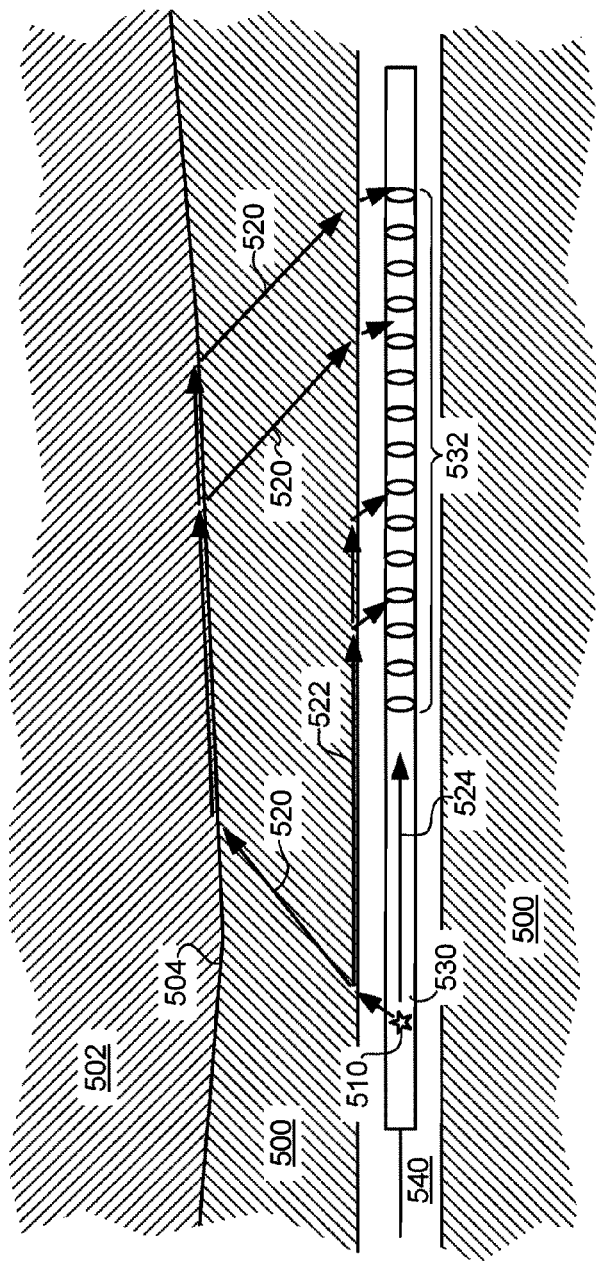
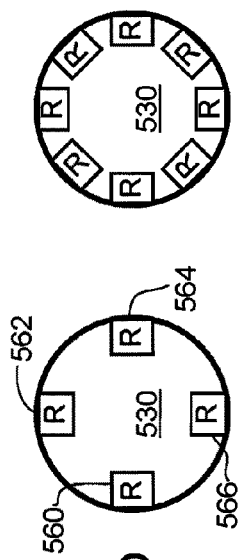
Fig. 5a
Fig. 5b
Fig. 5c

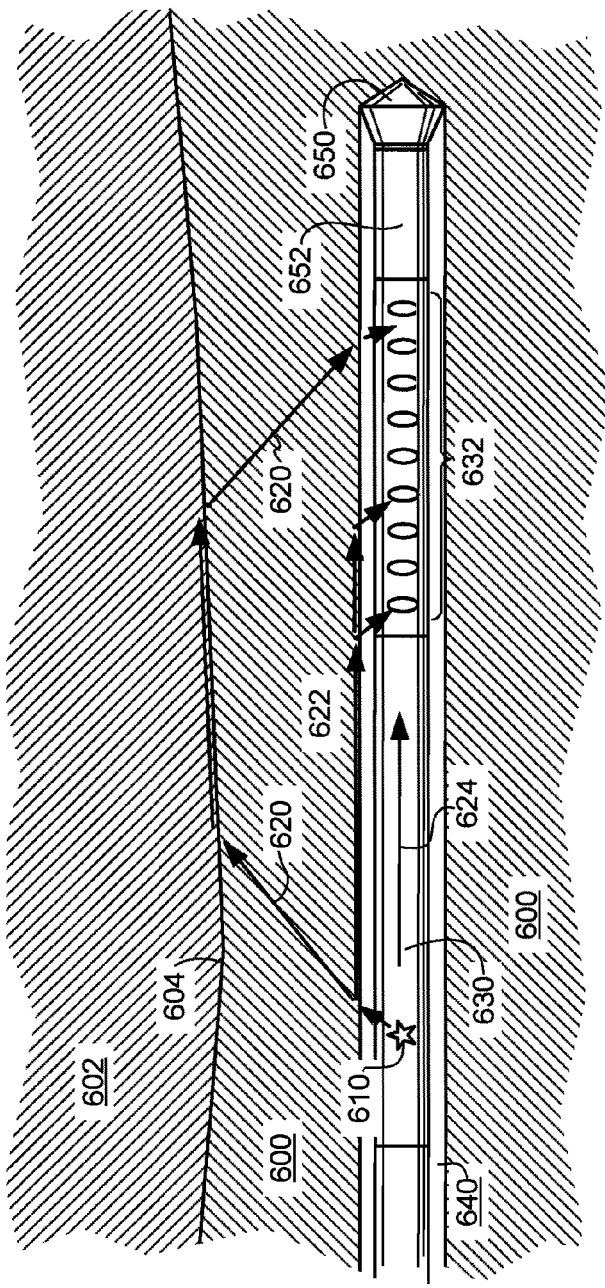
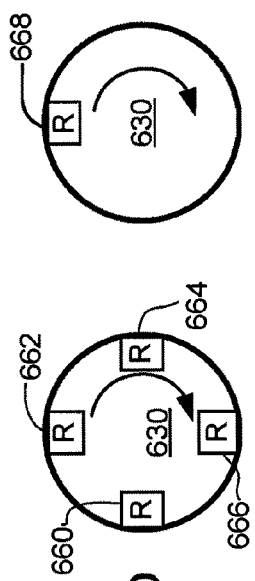
Fig. 6a
Fig. 6b
Fig. 6c

ANALYSIS REFRACTED ACOUSTIC WAVES MEASURED IN A BOREHOLE

BACKGROUND OF THE INVENTION

1. Field of the Invention

This patent specification relates to making downhole acoustic measurements and processing data therefrom. More particularly, this patent specification relates to systems and methods for analyzing downhole refracted acoustic energy measurements.

2. Background of the Invention

To drill hydrocarbon exploration and production wells there is an increasing need for accurate well placement in order to place the wellbore optimally in the reservoir. Recently, directional electromagnetics measurements have provided a means of determining the distances to and orientation of nearby Earth formation boundaries relative to the borehole as well as the resistivities of the corresponding formation layers while drilling horizontal and highly deviated wells. See, e.g., Q. Li, D. Omeragic, L. Chou, L. Yang, K. Duong, J. Smits, T. Lau, C. B. Liu, R. Dworak, V. Dreuillault, J. Yang, and H. Ye, "New directional electromagnetic tool for proactive geosteering and accurate formation evaluation while drilling," paper presented at the 46th SPWLA Annual Symposium, New Orleans, La., pp. 26-29, June 2005; and D. Omeragic, T. Habashy, C. Esmersoy, Q. Li, J. Seydoux, J. Smits, and J. R. Tabanou, "Real-Time Interpretation of Formation Structure From Directional EM Measurements," paper presented at the 47th SPWLA Annual Symposium, Veracruz, Mexico, pp. 4-7, June 2006.

While resistivity is a very important parameter to determine while prospecting for hydrocarbon-bearing formation layers, the acoustic velocity of each layer can also be very helpful, for example, in determining the lithology of a formation layer and whether hydrocarbons contained in a particular layer are in a liquid or gas state. See, e.g., A. Brie, F. Pampuri, A. Marsala, O. Meazza, "Shear Sonic Interpretation in Gas-Bearing Sands," SPE 30595, SPE Annual Technical Conference and Exhibition, Dallas, October 1995. Typically, conventional while-drilling sonic logs only provide sonic velocity information for the layer containing the tool, so obtaining this information for nearby formation layers is highly desirable for accurately positioning a well. See, e.g., Aron, J, Chang, S. K., Dworak, R., Hsu, K., Lau, L., Plona, T. J., Masson, J P, Mayes, J., McDaniel, G., Randall, C., and Kostek, S., "Sonic compressional measurements while drilling", SPWLA 35th Logging Symposium, paper SS pp. 1-12, 1994; and J. Aron, S. K. Chang, R. Dworak, K, Hsu, T. Lau, J-P. Masson, J. Mayes, G. McDaniel, C. Randall, S. Kostek and T. J. Plona, "Sonic Compressional Measurements While Drilling," SPWLA 35th Annual Logging Symposium, Jun. 19-23, 1994. Today, velocity information about layers above and below the tool is often unavailable when drilling a horizontal or highly deviated well.

Formation velocity information about the subsurface has often been provided before and while drilling using seismic surveys. See, e.g., O. Barkved et. al., "The Many Facets of Multicomponent Seismic Data", Oilfield Review, Schlumberger, Summer 2004. These provide only a very coarse image of the Earth formation's velocity structure with a resolution on the order of many meters. Walkaway VSPs performed during interruptions in the drilling process can be used to image the velocity structure ahead and around the bit and can often provide structural information whose uncertainty is typically approximately 5 meters. See, J. L. Arroyo et. al., "Superior Seismic Data from the Borehole", Oilfield Review, Schlumberger, Spring 2003. Besides the time used to acquire the VSP (often 12-24 hours), typical processing time for these surveys is 3-5 hours. Also, real time travel time information from seismic sources positioned on the surface to receivers positioned on the drillstring can provide for positioning the drill bit on a seismic curtain plot section. Finally, sonic logs provide velocity information while drilling about the formation layer containing the tool and can be used to refine or modify the velocity model used to process the seismic survey in real time. See, M. Hashem, D. Ince, K. Hodenfield, K. Hsu, "Seismic Tie Using Sonic-While-Drilling Measurements," SPWLA 40th Annual Logging Symposium, May 30-Jun. 3, 1999. However, these sonic logs do not provide information about the velocities of nearby formation layers particularly when drilling horizontal or highly deviated wells, or the distance to the layer boundaries from the borehole.

In homogeneous formations energy which radiates from the borehole continues to propagate away from the tool and is not recorded in the sonic waveform. In this situation only the modes and headwaves associated with the borehole itself are detected. The compressional and shear headwaves, flexural, quadropole and Stoneley modes are the best known of these.

In a heterogeneous formation energy is reflected from outside the borehole and can be detected by the receivers. This occurs if there is an impedance or velocity (slowness) contrast of either sign, that occurs over a short (compared to the signal wavelength) distance. In some cases the reflected waves can be processed to form a reflection image—this is the basis of the Borehole Acoustic Reflection Survey (BARS) sonic imaging service available from Schlumberger. Under good signal-noise conditions these reflections can be processed (migrated) to yield useful images of the strata surrounding the borehole. However, before this data can be migrated the reflected energy must be separated from the energy propagating directly from the source to the receiver in the form of borehole modes and borehole headwaves. This is done by filtering the recorded signals on the basis of their frequency, arrival time and apparent moveout velocity across the array. Unfortunately imaging reflectors which lie very close to the borehole can be problematic because the reflections lie very close to the borehole modes in time, frequency and moveout velocity.

This situation (where an interface is very close to the borehole) can be very important in practice. Often operators will attempt to drill horizontal borehole very close to the top of the reservoir to ensure a maximum of the oil-in-place will be recovered. It is not unusual for drillers to attempt to stay within 3 ft (1 m) of the top of the reservoir for a distance of several kilometers. A less important, but still significant situation occurs when one is attempting to correlate boundaries seen on reflection images with events in supporting logs. The apparent "fading" of the image close to the borehole often makes this essential task problematic.

In surface applications, refraction tomography has been used for velocity studies. Surface refraction tomography can be used for very near surface velocity surveys (150 ft), deep surveys (10 km) for mapping the structures of entire Earth basins, or, most commonly, field static corrections for seismic reflection data to eliminate the disturbing effects a weathering layer or near-surface low velocity zone. See, respectively: J. Zhang, M. N. Toksoz, "Nonlinear refraction traveltime tomography", Geophysics Vol 63, No. 5, September-October 1998; C. Zelt, P. J. Barton, "Three-dimensional seismic refraction tomography: A comparison of two methods applied to data from the Faeroe Basin", Journal of Geophysical Research, Vol. 103, No. B4, pp. 7187-7210, 1998; and W. N. De Amorim, P. Hubral, M. Tygel, "Computing Field Statics with the help of Seismic Tomography", Geophysical Prospecting 35 (8), 907-919, 1987.

Refraction tomography in logging applications has been proposed to obtain radial velocity profiles around the wellbore, as the interest there is often in determining damage done to the formation while drilling or alteration due to wellbore fluid invasion or changes in the stress field. See, S. Zeroug, H. P. Valero, S. Bose, "Monopole Radial Profiling of Compressional Slowness", SEG, 76th Annual Meeting, New Orleans, La., 2006. However, in the foregoing paper, there is an assumption that the background medium is a homogeneous formation layer and the focus is to observe alterations from this background. In B. Homby, "Tomographic reconstruction of near-borehole slowness using refracted borehole sonic arrivals", Geophysics, Vol. 58, No. 12, pp 1726-1738, 1993, a radial profiling algorithm is employed to image a nearby formation layer boundary using wireline logging measurements. The author makes use of other sources of information (in this case drilling reports) to orient the image.

SUMMARY OF THE INVENTION

According to embodiments, a system for measuring and analyzing refracted acoustic energy is provided. The system includes a plurality of receivers mounted on a downhole tool, the receivers being arranged and adapted to receive refracted acoustic energy from a downhole formation. An analysis system is in communication with the receivers and programmed to analyze measurements of refracted acoustic energy such that information relating to an azimuthal direction relative to the downhole tool of an interface within the downhole formation can be estimated.

According to further embodiments a method for measuring and analyzing refracted acoustic energy is provided. Refracted acoustic energy is received from a downhole formation using a downhole tool, and an azimuthal direction relative to the downhole tool of an interface within the downhole formation is estimated based at least in part on the received refracted acoustic energy.

According to yet further embodiments a system for controlling a drilling operation is provided. The system includes at least one receiver mounted on a downhole tool within a drill collar, the receiver being arranged and adapted to receive refracted acoustic energy from a downhole formation. An analysis system is in communication with the receiver and programmed to analyze measurements of refracted acoustic energy such that information relating to the formation can be estimated. A steering system is adapted and mounted such that a drilling trajectory can be maintained or altered based at least in part on the estimated information.

According to yet further embodiments a method for controlling a drilling operation is provided. Refracted acoustic energy is received from a downhole formation using a downhole tool within a drill collar. Information relating to the formation is estimated based at least in part on the received refracted acoustic energy, and the drilling trajectory is steered based at least in part on the estimated information.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5a illustrates the downhole measurement of refracted energy by a tool in a borehole;

FIGS. 5b and 5c are examples of cross-sections of tool shown in FIG. 5a;

FIG. 6a illustrates the downhole measurement of refracted energy by an LWD tool in a borehole during a drilling operation;

FIGS. 6b and 6c are examples of cross-sections of LWD tool shown in FIG. 6a;

FIG. 15a is a curtain plot showing horizontal resistivity at various depths for each measurement station;

FIG. 15b is a legend showing resistivity values that correspond to hues as shown in FIG. 15a;

FIG. 16a is a curtain plot based on a joint inversion of refracted acoustic and electromagnetics measurements showing compressional velocity at various depths for each measurement station;

FIG. 16b is a legend showing velocity values that correspond to the hues as shown in FIGS. 14 and 16a.

DETAILED DESCRIPTION OF THE PREFERRED EMBODIMENTS

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 1:
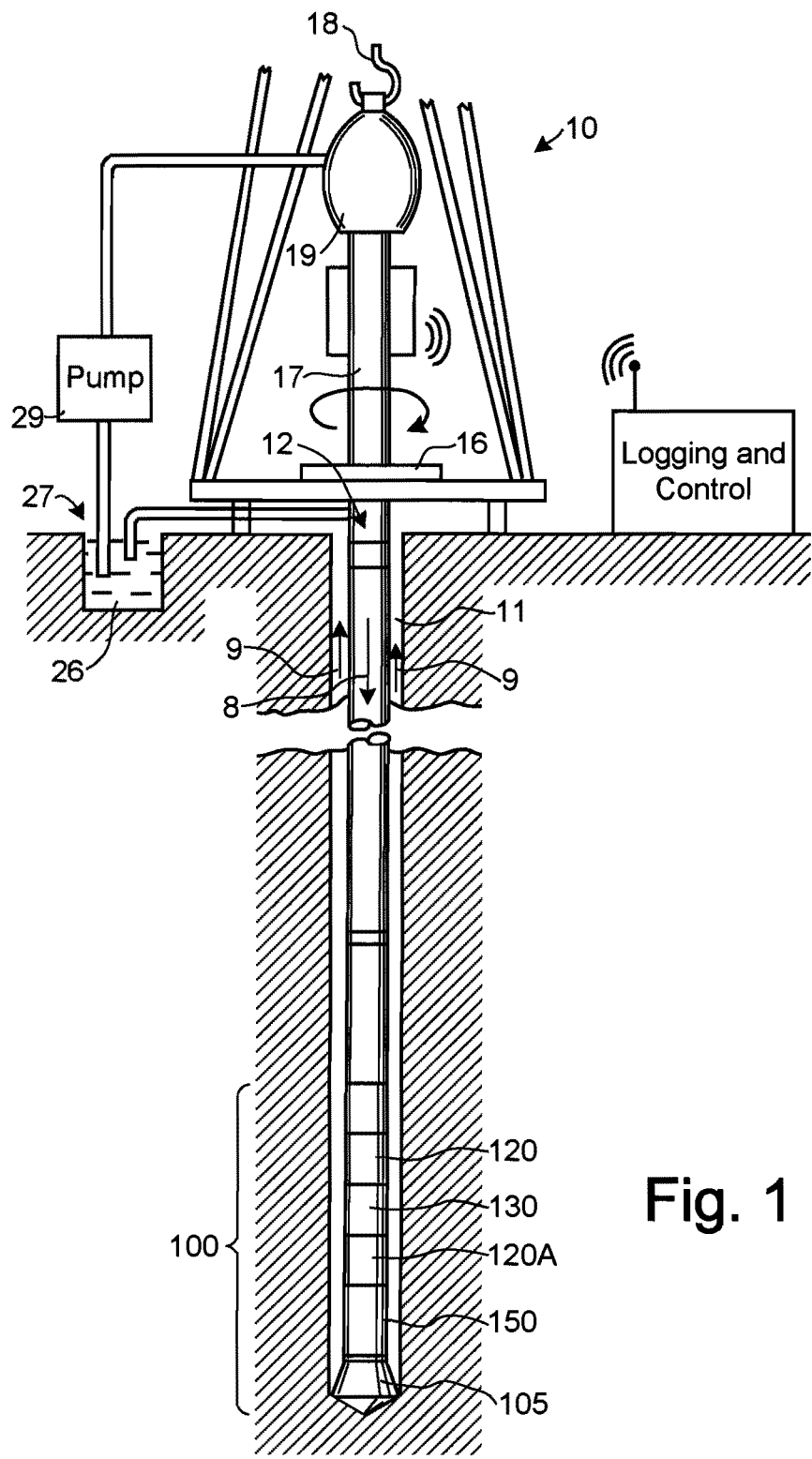
FIG. 1 illustrates a wellsite system in which the present invention can be employed.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes both pressure and sonic measuring devices.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling." In this embodiment, a roto-steerable subsystem 150 (FIG. 1) is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well. A directional drilling system may also be used in vertical drilling operation as well. Often the drill bit will veer off of a planned drilling trajectory because of the unpredictable nature of the formations being penetrated or the varying forces that the drill bit experiences or the geology may not be where it is expected to be. When such a deviation occurs, a directional drilling system may be used to put the drill bit back on course. A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems. In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953 all herein incorporated by reference. In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut sideways in order to generate a curved hole. Examples of push-the-bit type rotary steerable systems, and how they operate are described in U.S. Pat. Nos. 5,265,682; 5,553,678; 5,803,185; 6,089, 332; 5,695,015; 5,685,379; 5,706,905; 5,553,679; 5,673,763; 5,520,255; 5,603,385; 5,582,259; 5,778,992; 5,971,085 all herein incorporated by reference. Alternatively, directional drilling could be accomplished using a downhole drilling motor such as a mud motor which is driven by hydraulic power of drilling mud. A piece of bent pipe known as a "bent sub" is included near the top of the mud motor to allow trajectory adjustments.

Figure 2:
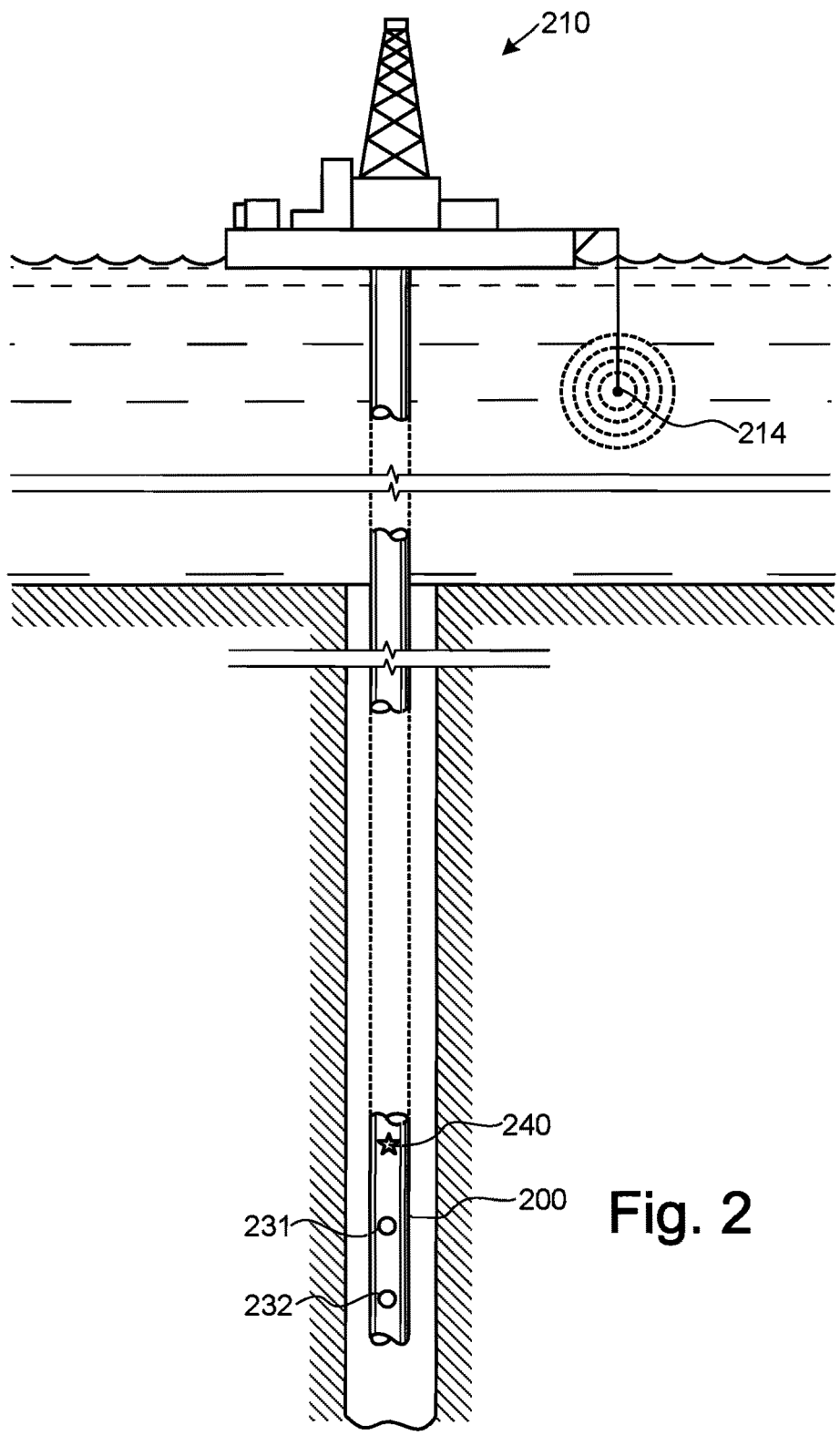
FIG. 2 illustrates a sonic logging-while-drilling tool which can be the LWD tool.

FIG. 2 illustrates a seismic logging-while-drilling tool which can be the LWD tool 120, or can be a part of an LWD tool suite 120A of the type described in U.S. Pat. No. 6,308,137, incorporated herein by reference. In a disclosed embodiment, as shown in FIG. 2, an offshore rig 210 is employed, and a seismic transmitting source or array 214 is deployed near the surface of the water. Alternatively, any other suitable type of uphole or downhole source or transmitter can be provided. An uphole processor controls the firing of the transmitter 214. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 200 includes at least acoustic receivers 231 and 232, which are coupled to a signal processor so that recordings may be made of signals detected by the receivers in synchronization with the firing of the signal source. Alternatively, a downhole acoustic source 240 can be provided as is further described herein.

Figure 3:
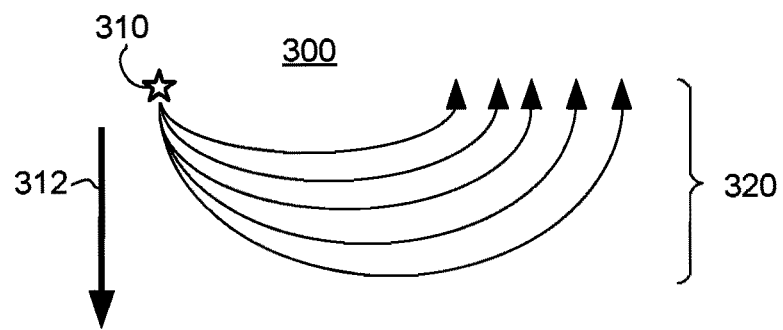
FIG. 3 illustrates the mechanism of refraction in a gradually changing medium.
Figure 4:
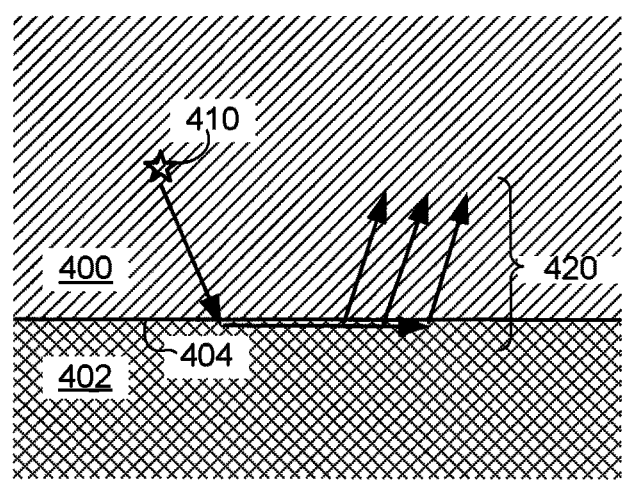
FIG. 4 illustrates the mechanism of refraction in the case of a nearby interface.

Energy waves can be returned back towards a tool or other source though the mechanism of refraction. FIG. 3 illustrates the mechanism of refraction in a gradually changing medium. Medium 300 has a gradually and continuously increasing velocity profile in the direction of arrow 312. Acoustic source 310 emits acoustic energy along ray paths 320. Because the medium velocity is gradually increasing, the ray paths are curved as shown in FIG. 3. However, in many downhole situations the velocity profile is not gradually increasing, but rather there is a distinct interface. FIG. 4 illustrates the mechanism of refraction in the case of a nearby interface. Medium 400 has lower velocity than medium 402, the two media being separated by an interface 404. Due to interface 404, energy from source 410 travels along interface 404 in the form of headwaves, as shown by ray paths 420. Thus where a well sits in the lower velocity medium and a higher velocity medium lies very nearby, this model of refracted energy can be used to analyze the data.

FIG. 5a illustrates the downhole measurement of refracted energy by a tool in a borehole. Borehole 540 lies entirely within subterranean rock formation 500 having a first propagation velocity $v_1$. A nearby rock formation 502 has a propagation velocity $v_2$ and is separated from formation 500 by interface 504. Furthermore, in this example, $v_2 > v_1$. Tool 530 lies within borehole 540. Tool 530 can be a wireline deployed tool, or it can be deployed via different means such as via coiled tubing, or on a drill collar during a drilling operation. Acoustic source 510 is disposed on tool 530 as shown and generates acoustic energy. The acoustic energy travels along several ray paths corresponding to different propagation modes. The tool mode propagates along the body of the tool as shown by ray path 524. A compressional headwave propagates along the borehole wall, as shown by ray path 522. The energy refracted by interface 504 travels along through formation 500 towards interface 504, along interface 504 and then back through formation 500 towards a receiver array 532 as shown by ray paths 520.

Assuming $d_0$ is the distance from the source to the borehole wall and $d_1$ is the distance from the borehole wall to interface 504. Using $D_n$ to denote the source-receiver distance, and $v_0$ for the borehole fluid velocity, the arrival times for refracted wavefields traveling along ray paths 520, become:

$$t_1^n = 2\frac{d_0}{v_0}\sqrt{1 - \left(\frac{v_0}{v_1}\right)^2} + \frac{D_n}{v_1} \qquad (1)$$

$$t_2^n = 2\frac{d_0}{v_0}\sqrt{1 - \left(\frac{v_0}{v_2}\right)^2} + 2\frac{d_1}{v_1}\sqrt{1 - \left(\frac{v_1}{v_2}\right)^2} + \frac{D_n}{v_2} \qquad (2)$$

for $D_n > \dfrac{2d_0}{\sqrt{\left(\frac{v_1}{v_0}\right)^2 - 1}}$ and $D_n > 2d_0 \left( \dfrac{1}{\sqrt{\left(\frac{v_2}{v_0}\right)^2 - 1}} + \dfrac{1}{\sqrt{\left(\frac{v_2}{v_0}\right)^2 - 1}} \right)$ (refraction conditions)

Both equations (1) and (2) are of the form:

$$t_k^n = t_k^0 + \frac{D_n}{v_k} \qquad (3)$$

describing travel times that vary linearly with the source-receiver offset. The term $t_k^0$ describes the intersection with the time axis of the extrapolation of the straight lines to zero offset. The slowness of both layers can be determined using equation (3), either the borehole diameter or the fluid velocity from equation (1), and, finally, the unknown distance $d_1$ from equation (2).

As shown in FIG. 5a, when another formation with a higher compressional velocity is located close to the borehole an additional headwave is generated on the interface between the two formations. For receivers close to the source the headwave on the borehole wall arrives first. However it has been found that at greater source-receiver separations the headwave propagating along the interface between formations is detected first. The arrival time and moveout across the array can be analyzed to determine the distance from the borehole to the boundary between the formations.

FIGS. 5b and 5c are examples of cross-sections of tool shown in FIG. 5a. In FIG. 5b, four receivers 560, 562, 564 and 566 are located at each receiver station, thereby giving azimuthal resolution to the refracted acoustic energy data. FIG. 5c shows an arrangement of eight azimuthally distributed receivers for each receiver station in array 532 of tool 530 (as shown in FIG. 5a), thereby providing greater azimuthal resolution.

FIG. 6 illustrates the downhole measurement of refracted energy by an LWD tool in a borehole during a drilling operation. Borehole 640 lies entirely within subterranean rock formation 600 having a first propagation velocity $v_1$. A nearby rock formation 602 has a propagation velocity $v_2$ and is separated from formation 600 by interface 604. As in the example of FIG. 5, in this example $v_2 > v_1$. Bottom hole assembly 630 lies within borehole 640 and includes drill bit 650 and roto-steerable subsystem 652. Roto-steerable subsystem 652 provides directional drilling and geosteering in response to analysis of the refracted energy measurements. Alternatively, subsystem 652 could include a mud motor and bent sub to provide directional drilling capability. Acoustic source 610 is disposed on assembly 630 as shown and generates acoustic energy. The acoustic energy travels along several ray paths corresponding to different propagation modes. The tool mode propagates along the body of the tool as shown by ray path 624. A compressional headwave propagates along the borehole wall, as shown by ray path 622. The energy refracted by interface 604 travels along through formation 600 towards interface 604, along interface 604 and then back through formation 600 towards a receiver array 632 as shown by ray paths 620. Although receiver array 632 is shown closer to drill bit 650 than source 610, according to an alternative embodiment, receiver array 632 is positioned farther away from drill bit 650 than source 610 in order to reduce the amount of noise received from the drill bit.

FIGS. 6b and 6c are examples of cross-sections of LWD tool shown in FIG. 6a. In FIG. 6b, four receivers 660, 662, 664 and 666 are located at each receiver station, thereby giving azimuthal resolution to the refracted acoustic energy data. However, due to the rotation of the drill collar during a drilling operation, additional azimuthal resolution can be obtained by making measurements while the collar is rotated to different positions. For example, FIG. 5c shows an arrangement including only a single receiver for each receiver station. Azimuthal resolution is provided by making measurements at different rotational positions of the drill collar.

Figure 7:
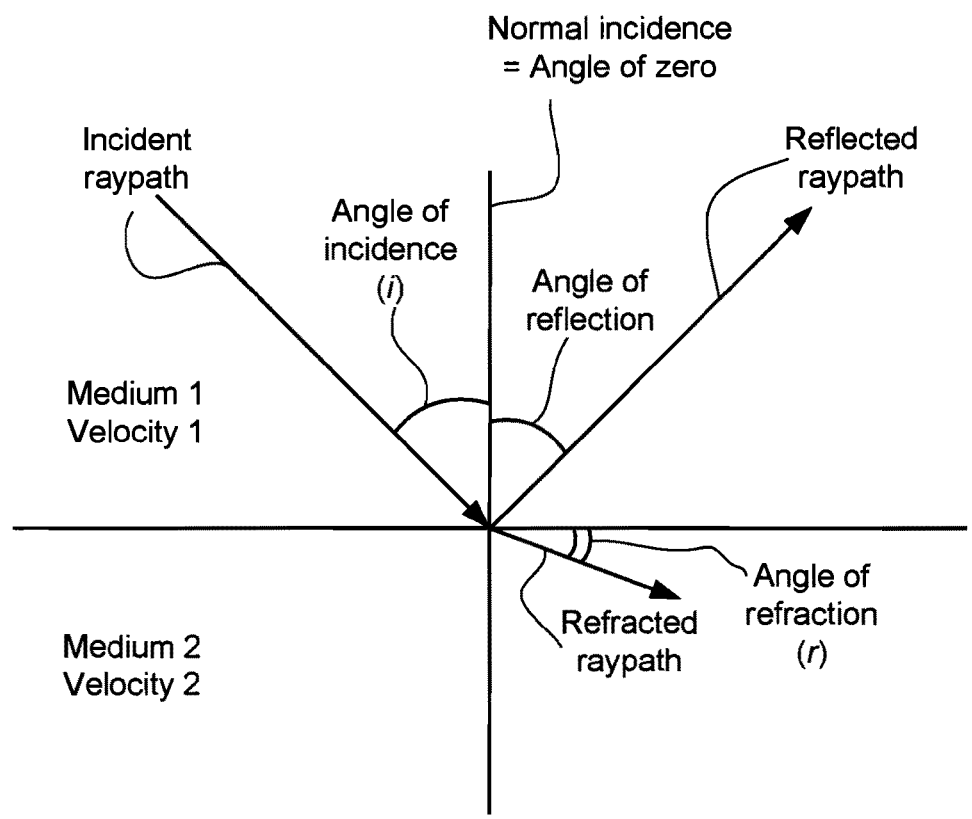
FIG. 7 provides a basic illustration of Snell's law.

As used herein the term "refraction" refers to the change in the direction of travel of a wavefront, or the bending of a ray, as it passes from one medium to another, expressed mathematically by Snell's law. FIG. 7 provides a basic illustration of Snell's law. Snell's Law is given in Equation (4).

$$\frac{\sin i}{v_1} = \frac{\sin r}{v_2} \quad (4)$$

Here i and r are the incident and refracted angles as shown in FIG. 7. $v_1$ and $v_2$ correspond to the velocities of the layers Medium 1 and Medium 2 shown in FIG. 7. Of particular interest is the case where the refracted wave travels along the interface between two media. This occurs when the angle of incidence is the "critical angle", e.g. where the refraction angle, r, is 90 degrees and the incidence angle is given by $$\sin i = \frac{v_1}{v_2} \quad (5)$$

Figure 8:
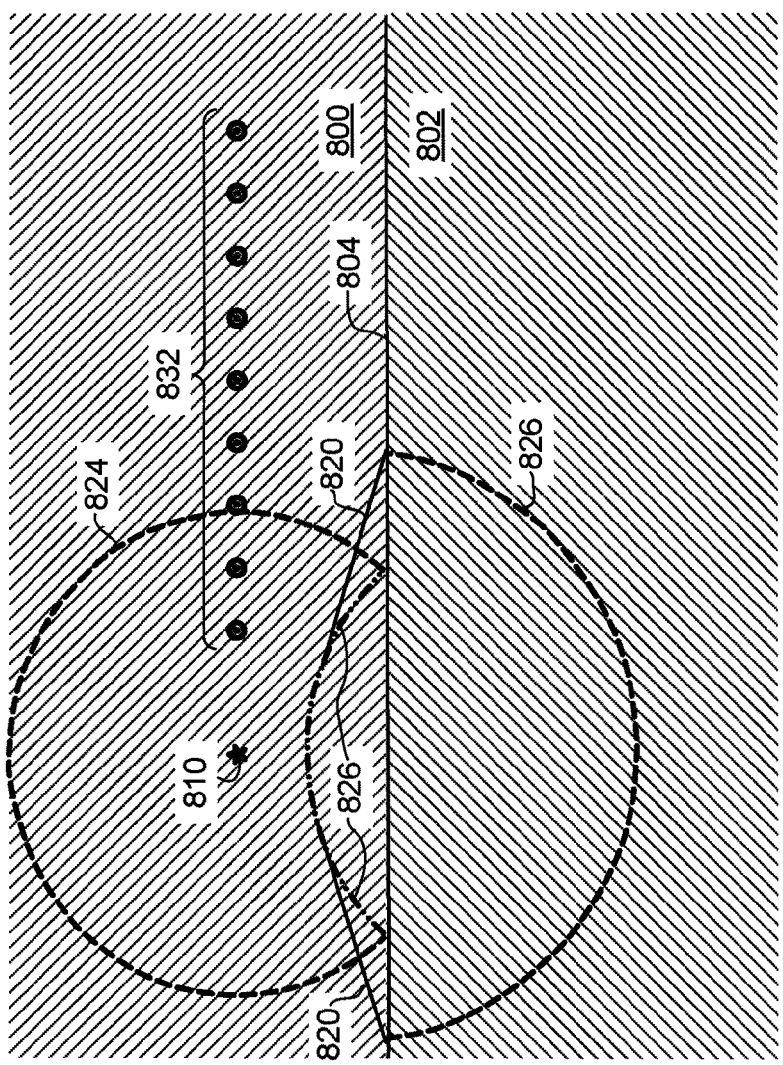
FIG. 8 illustrates energy waves refracting along Earth formation layer boundaries.

FIG. 8 illustrates energy waves refracting along Earth formation layer boundaries. FIG. 8 is a shows the wavefronts of a sonic wavefield propagating from a source 810 to an array of receivers 832. The source 810 and receiver array 832 positioned on a tool (not shown) contained in a horizontal wellbore (not shown) and are located 20 feet apart. The wellbore is disposed in formation layer 800. There is a horizontal Earth formation layer interface 804 below the borehole that separates formation layer 800 from another formation layer 802. The velocity of sound in the formation layer 802 is greater than that in formation layer 800. Wavefronts 824 represent the direct waves, wavefront 826 represents the reflected wave, and wavefronts 820 represent the critically refracted headwaves.

The wave propagating from the source first refracts along the borehole wall (not shown) and later refracts across the formation layer boundary 804 below the borehole. Thus there are two wavefronts approaching the receiver array: a direct or compressional wave traveling along the borehole wall (marked by wavefront 824); and a wave which has refracted along the nearby formation layer boundary, traveled within the formation layer 802, and then refracted back towards the receiver array (marked by wavefront 820). Depending upon the spacing between the transmitter and receiver array, the receivers will record either the direct compressional or refracted arrival first.

As described in further detail below, it has also been found that the refracted wave arrivals do not arrive at the azimuthally distributed receivers of the array simultaneously, but rather the wave arrives first at the receivers facing the bottom of the borehole (towards the formation layer boundary 804) and later at the receivers facing the top of the wellbore (away from the formation layer boundary 804).

Figure 9:
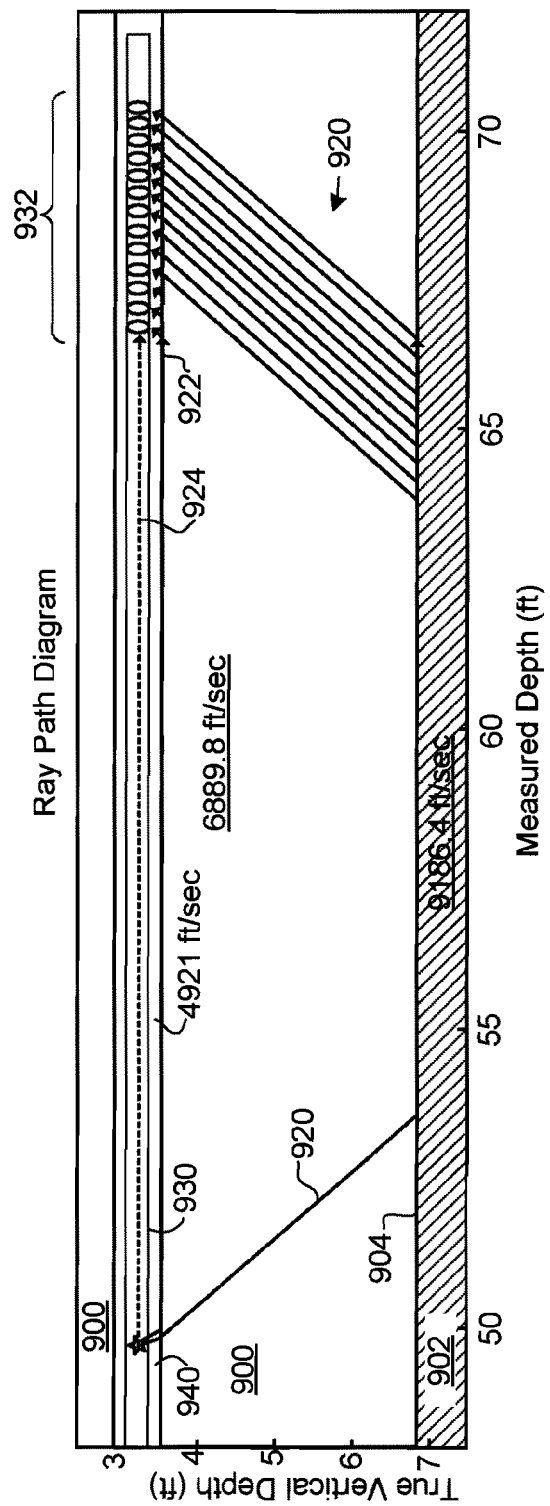
FIG. 9 is a 2D ray tracing diagram describing propagation paths of shortest travel time.

FIG. 9 is a 2D ray tracing diagram describing propagation paths of shortest travel time. Sonic waves travel from a source 940 to an array of receivers 932. Here the transmitter to receiver spacing is 17 feet. The formation layer boundary 904 separates formation 900 from formation 902. Borehole 940 having a borehole fluid with a wavespeed of 4921 ft/sec (1500 m/s) is shown within formation 900 which having a wavespeed of 6889.8 ft/sec (2100 m/s). Additionally, borehole 940 has a diameter of 6.5 inches, and downhole tool 930 has a diameter of 4.75 inches. The formation 902 has a wavespeed of 9186.4 ft/sec (2800 m/s). The refracted ray paths having the shortest travel times are shown with arrows 920. Arrow 922 represents the ray for the direct compressional waves refracting along the borehole wall. Arrow 924 represents the sonic energy propagating along the tool itself. When computing the travel times for direct compressional waves refracting along the borehole wall, a radial model of slowness around the wellbore is used. For the purposes of computing the travel times of waves refracting across nearby formation layer boundaries, a 2D layered formation model is used with the wellbore treated as if it were another formation layer. It has been found that the frequency of the source wave (8 kHz) makes this a reasonable way of modeling the travel times of waves refracting across nearby formation layer boundaries. In the case shown in FIG. 9, for receivers farther from the source, the first arrivals arise from the waves refracting through the nearby formation layer, while for receivers closer to the source, the first arrivals come from the waves refracting along the borehole wall.

Figure 10:
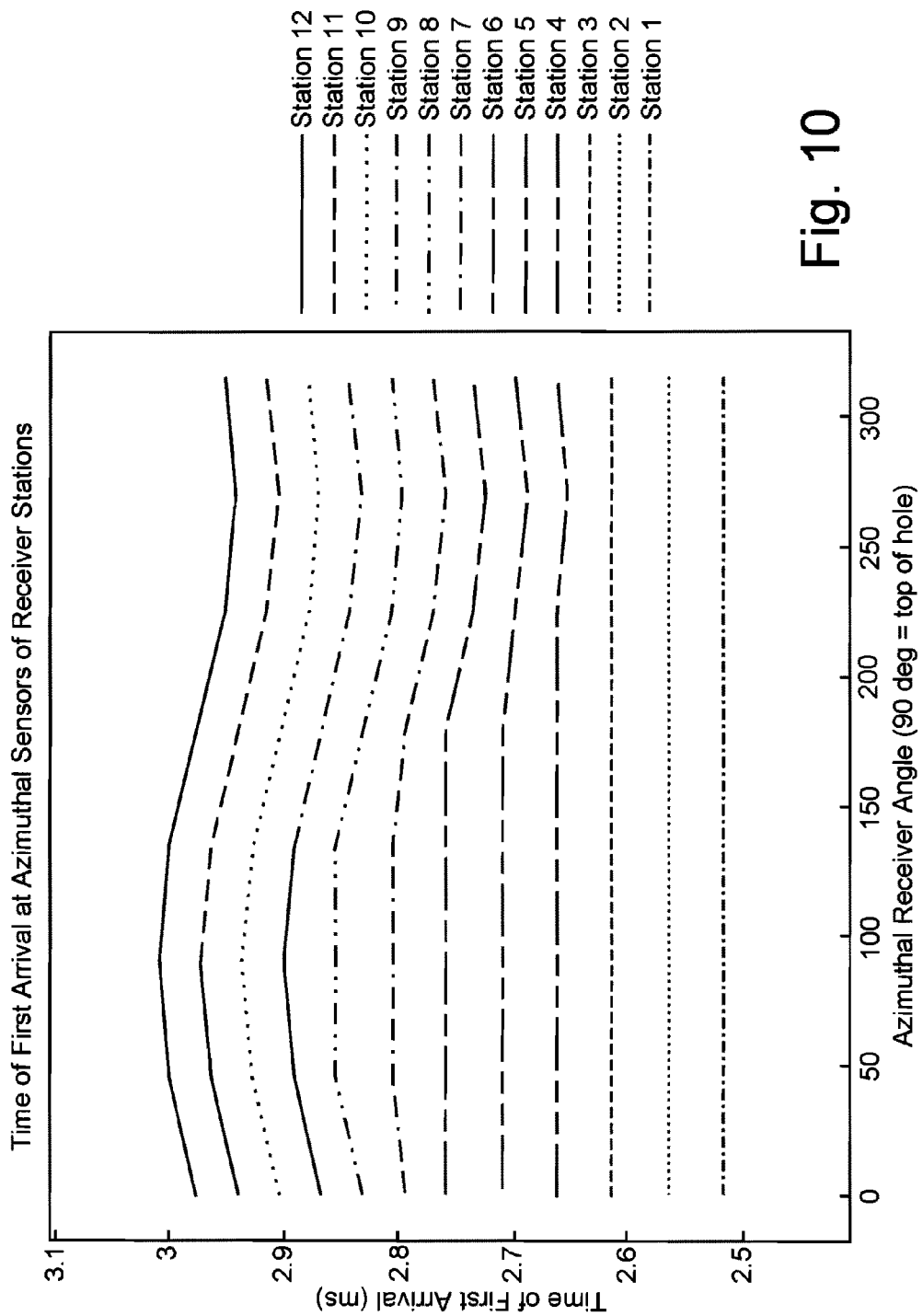
FIG. 10 is a graph of the first arrival times as a function of receiver azimuth for several receiver stations.

FIG. 10 is a graph of the first arrival times as a function of receiver azimuth for several receiver stations. The arrival times shown were computed via ray tracing based on the example shown in FIG. 9, with the tool on which the source and receiver stations are positioned centered within the wellbore. Station 1 is closest to the source and Station 12 is the furthest. Each receiver station includes eight azimuthally distributed receivers in an arrangement as shown in FIG. 5c. As can be seen from FIG. 10, for the shorter source-receiver spacings (e.g. stations 1-3), the arrival times are constant with respect to sensor azimuth, since the tool is centered in the wellbore. For longer source-receiver spacings (e.g. stations 9-12) a one-period variation in the arrival times can be observed. For intermediate source-receiver spacings (e.g. stations 4-8), the variation occurs only for the sensors closer to the bottom of the borehole.

From Snell's Law and elementary geometry, it is easy to show that when the first arrival arises from refractions through a nearby formation layer, the time of first arrival is given by $$T(\alpha) = T + \left(\frac{1}{v_f \cos\theta} - \frac{\tan\theta}{v_{Far}}\right)(r_{borehole} - r_{tool}\sin(\alpha - \beta)) \quad (6)$$

where $\alpha$ is the receiver azimuth around the circumference of the tool sonde (90 degrees is towards the top of the wellbore); $r_{borehole}$ and $r_{tool}$ are the radii of the borehole and tool respectively; $v_f$ and $v_{Far}$ are the compressional wavespeeds of the wellbore fluid and nearby formation layer; $\theta$ is the angle of incidence of the wave at the receiver array; while T is a number independent of the receiver azimuth $\alpha$ that depends on the transmitter receiver spacing. The phase of the sinusoid $\beta$ is related to the formation azimuth and whether the corresponding formation layer boundary is above or below the tool in the formation. Thus the size of the variation in the arrival times is thus given by $$2\left(\frac{1}{v_f \cos\theta} - \frac{\tan\theta}{v_{Far}}\right)r_{tool} \quad (7)$$

which from FIG. 10 is approximately 68 microseconds. Thus a significant result of the analysis described herein is that the magnitude of the variation in arrival times of some of the stations is great enough to accurately determine the azimuthal position of the nearby interface.

Figure 11:
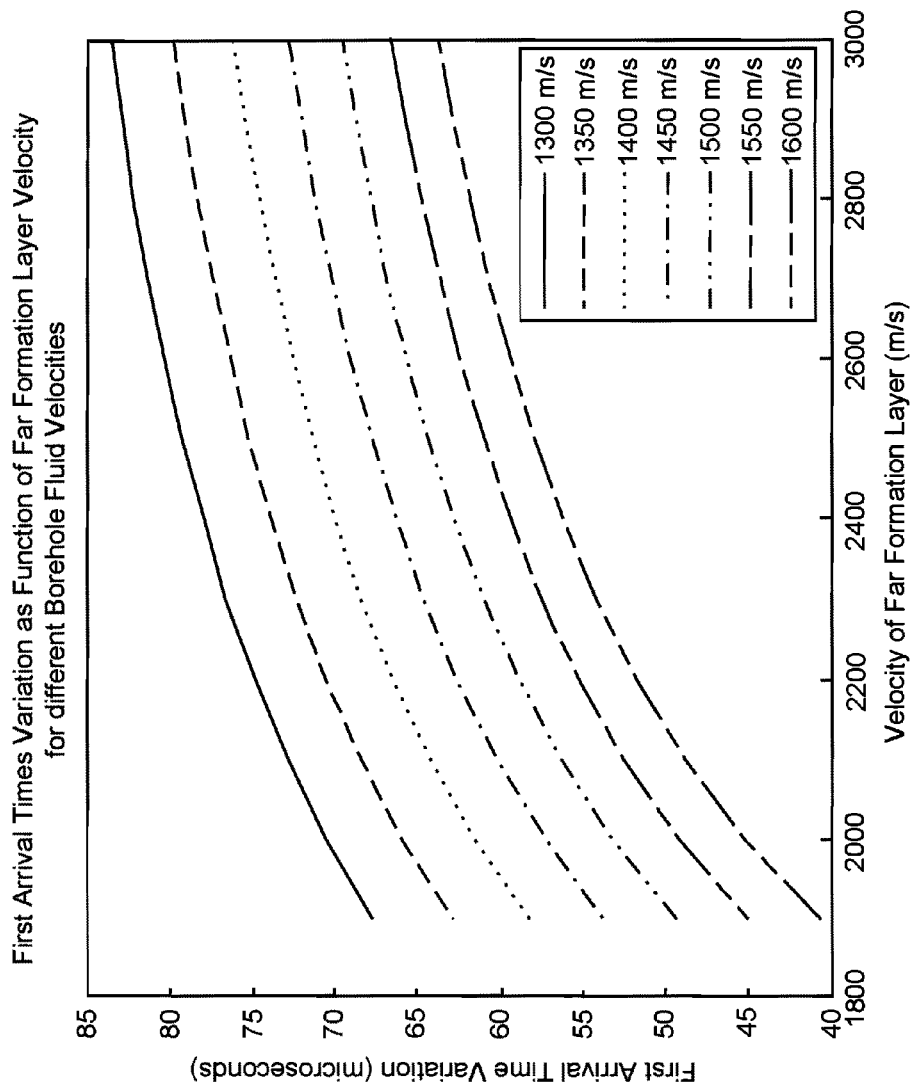
FIG. 11 is a graph showing the magnitudes of variations in first arrival times as a function of far formation layer velocity for different borehole fluid velocities.

FIG. 11 is a graph showing the magnitudes of variations in first arrival times as a function of far formation layer velocity for different borehole fluid velocities. The data shown in FIG. 11 was calculated according to the example shown in FIG. 9 and as described above with respect to FIGS. 9 and 10. From FIG. 11 it can be seen that typical values of variations range from 50 to 80 microseconds. Since common sonic tool hardware samples these waveforms at 100 kHz, this variation will result in a 5 to 8 sample pixel variation in the recorded measurement data, well within the resolution of the standard receiver sensor. Thus, for many applications common sonic tool hardware can be used to distinguish the azimuthal orientation of a nearby interface using refraction data analysis as described herein.

It has been found that when the wellbore is highly deviated and not necessarily parallel to the nearby Earth formation layer boundary, the corresponding changes in the size of the arrival times variation is quite mild. A relative formation dip between 84 and 96 degrees (where 90 degrees indicates a wellbore horizontal to the formation layers) leads to changes in the size of the arrival times variation of less than 5 microseconds.

It has also been found that the effect of the borehole on the waves refracting along nearby formation layer boundaries is mild when the center frequency of the source wavelet is approximately 8 kHz, a typical choice of frequency for a sonic tool. The wavelength, approximately 13 to 15 inches, is on the order of two or three times a typical wellbore diameter. Further, the effect of the tool eccentering on the arrival times arising from these refracted waves from nearby formation layers is also minimal especially when the tool is equipped with stabilizers (as is usual) which limit the eccentering of the tool. In particular, it has been found using numerical simulation, that the effect on the wave refracted along a nearby interface is significantly smaller than the effect on the logging modes propagating on the borehole wall.

Figure 12:
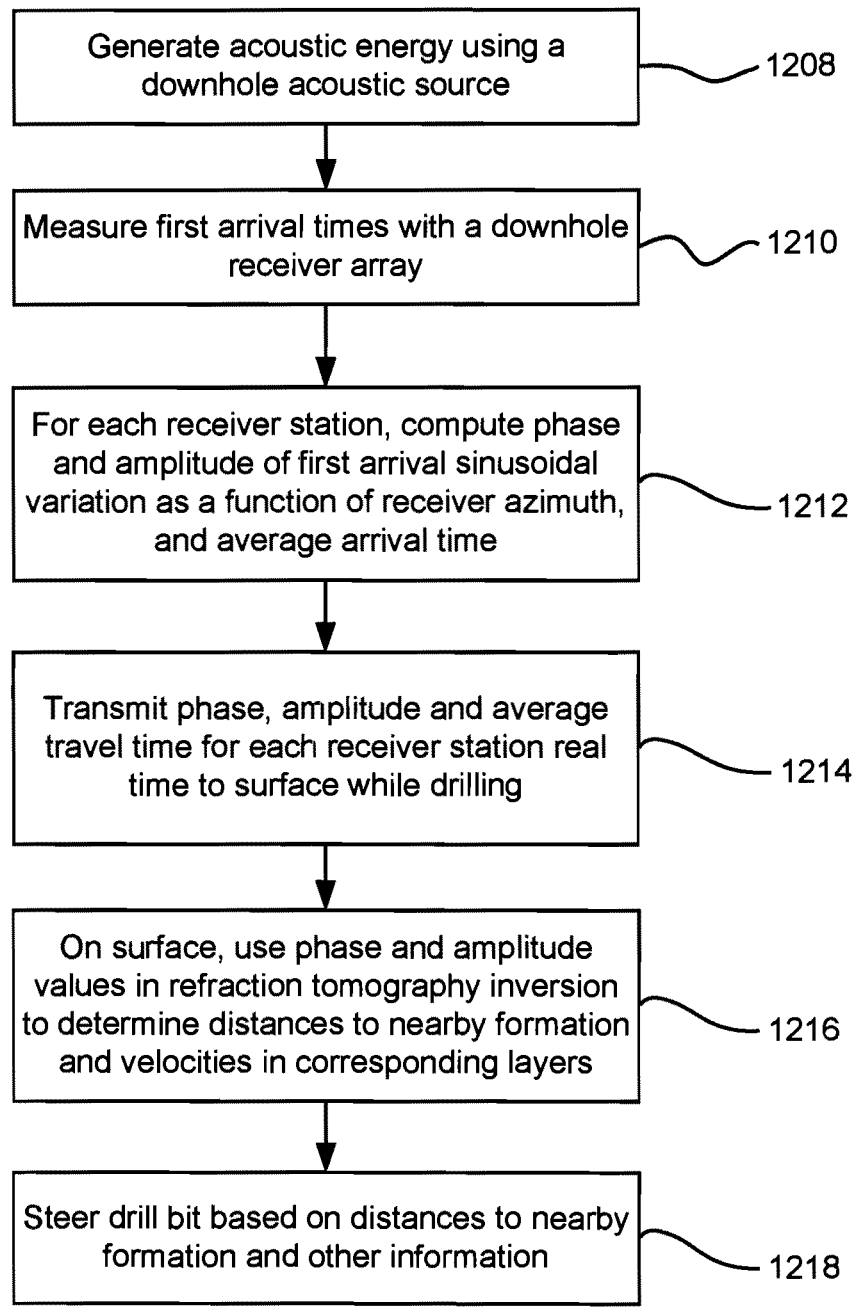
FIG. 12 is a flow chart showing an example of making downhole measurements, processing, telemetry, and surface processing.

FIG. 12 is a flow chart showing an example of making downhole measurements, processing, telemetry, and surface processing. In step 1208, a downhole acoustic source is used to generate acoustic energy. In step 1210, the first arrival times are measured at a set of receivers distributed azimuthally around the tool sonde circumference at receiver stations positioned along one or multiple receiver arrays, of sonic waves refracting across nearby Earth formation layer boundaries or along the borehole wall. The first arrival times can be computed from the raw traces recorded at these receivers using the well known algorithm described in H. P. Valero, M. Tejada, D. Murray, "Improved First-Motion Algorithm to Compute High-Resolution Sonic Log", Extended Abstract: SPE International Petroleum Conference in Mexico, SPE 90995, 2004, which is incorporated by reference herein. In order to use the first arrival times corresponding to several azimuths at each receiver station, these first arrival times are recorded at several moments while drilling. In the case of an LWD application, this is easily possible because the drilling rate of penetration is always low compared to the angular velocity of the tool string.

In step 1212, using a simple linear least-squares procedure, the phase and amplitude of the first arrivals sinusoidal variation as a function of receiver azimuth as well as the average arrival time can be computed downhole for each receiver station. Indeed, suppose that $(\alpha_k, f(\alpha_k))$ are the K azimuths and first arrival times recorded at a receiver station. First compute the average arrival time via $$T = \frac{1}{K}\sum_{k=1}^{K} f(\alpha_k) \quad (8)$$

We should now like to compute the amplitude, A, and phase, B, of the variation as described in the equation $f(\alpha_k) = A\sin(\alpha_k - B) + T$. To convert this equation into a linear equation, we consider the data to be $(\cos\alpha_k, \sin\alpha_k, f(\alpha_k))$. We then solve the linear system given by $$\begin{pmatrix} \cos\alpha_1 & \sin\alpha_1 \\ \cos\alpha_2 & \sin\alpha_2 \\ \vdots & \vdots \\ \cos\alpha_K & \sin\alpha_K \end{pmatrix} \begin{pmatrix} \tilde{A} \\ \tilde{B} \end{pmatrix} = \begin{pmatrix} f(\alpha_1) - T \\ f(\alpha_2) - T \\ \vdots \\ f(\alpha_K) - T \end{pmatrix} \quad (9)$$

Following A. Gelman, J. B. Carlin, H. S. Stem, and D. B. Rubin, "Bayesian Data Analysis", Chapman & Hall/CRC, Boca Raton, Fla., 2000, incorporated herein by reference, Equation (9) can be rewritten as $$G\begin{pmatrix} \tilde{A} \\ \tilde{B} \end{pmatrix} = d,$$

we obtain $$\begin{pmatrix} \tilde{A} \\ \tilde{B} \end{pmatrix} = (G^T G)^{-1} G^T d.$$

If we then note that $A\sin(\alpha_k - B) = \tilde{A}\cos\alpha_k + \tilde{B}\sin\alpha_k$, and then use the simple angle sum trigonometric identity $A\sin(\alpha_k - B) = A\sin\alpha_k \cos B - A\sin B \cos\alpha_k$, it is easy to see that $$A = \sqrt{\tilde{A}^2 + \tilde{B}^2} \quad (10)$$

$$B = a\tan\left(-\frac{\tilde{A}}{\tilde{B}}\right)$$

In step 1214, these phase B, amplitude A, and average travel time T measurements, computed at each receiver station along one or more receiver arrays can then be transmitted in real time to the surface while drilling the well using either a mud-pulse telemetry or wired drill pipe telemetry system.

According to another example, an alternate processing technique can be used in step 1212 for processing the measurements downhole and preparing a telemetry stream for transmission to the surface. The phase and amplitude of the variation of the first arrival times are estimated using a variation of a slowness-time coherence procedure as described in Kimball, C. V., and Marzetta, T. L., "Semblance processing of borehole acoustic array data," Geophysics, Vol. 49, No. 3, p. 274-281, March 1986, incorporated herein by reference. Let $x_\alpha(t)$ be the waveform recorded at a single receiver station with azimuth $\alpha$. We compute the incoherent and coherent energy for a set of time windows of duration $T_w$ starting near a fixed recording time T.

$$E_i(A, B; T) = \sum_{\alpha \in \Omega} \int_0^{T_w} x_\alpha^2(t + T + A\cos(\alpha - B))\,dt \quad (11)$$

$$E_c(A, B; T) = \int_0^{T_w} \left[\sum_{\alpha \in \Omega} x_\alpha(t - T + A\cos(\alpha - B))\right]^2 dt \quad (12)$$

Typical values for this computation are: $T_w$=150 μs, A={0, 3, 6, ... 105} μs, β={0, 10, 20, ... 350} deg. The coherence estimate near the recording time T is a number between 0 and 1 given by $$coh(A, B; T) = \sqrt{\frac{E_c(A, B; T)}{|\Omega|E_i(A, B; T)}} \quad (13)$$

where $|\Omega|$ is the number of receiver azimuths $\alpha$. An estimate for the phase $\hat{B}_T$ and amplitude $\hat{A}_T$ of the variation of the arrival times for the time windows starting near the recording time T is found by determining where the coherence is maximized.

$$(\hat{A}_T, \hat{B}_T) = \underset{A, B}{\arg\max}\, coh(A, B; T) \quad (14)$$

These estimations can be performed for a set of time windows with typical values of T=$T_0$+{0, 2, 4, ... , 30}×$10^{-5}$ seconds where $T_0$ is a time offset that depends on the transmitter receiver spacing. A final estimate of the phase $\hat{B}$ and amplitude $\hat{A}$ of the variation of the arrival times is then made via $$(\hat{A}, \hat{B}; T_1) = \underset{T}{\arg\max}\, coh(\hat{A}_T, \hat{B}_T; T) \quad (15)$$

The values ($\hat{T}$=$T_1$+$T_w$, $\hat{A}$, $\hat{B}$) are then transmitted to the surface in the mud pulse telemetry, since maximal values for coherence typically occur for time windows which are covering the first portion of the arriving refracted wave. Alternately, one can apply the first arrival detection algorithm to the waveform obtained according to $$\sum_{\alpha \in \Omega} x_\alpha(t - \hat{A}\cos(\alpha - \hat{B}))$$

to obtain a value of $\hat{T}$ to be transmitted.

At the surface, in step 1216, the received phase and amplitude measurements are used in a refraction tomography inversion to determine the orientation of and distances to nearby formation layer boundaries as well as the velocities of the corresponding layers. In step 1218, in the case of a drilling application, the drill bit is steered, or geosteered, based at least in part on the calculated or estimated distances to nearby formation interfaces. Several processing options can be used for step 1216, including the use of lookup tables, gradient search algorithms, and Markov Chain Monte Carlo algorithms. In addition, following the suggestion in J. Zhang, M. N. Toksoz, "Nonlinear refraction traveltime tomography", Geophysics Vol 63, No. 5, September-October 1998, incorporated herein by reference, the average travel time measurements T are not used directly, but rather the corresponding average and apparent slownesses are used in step 1216.

According to one example for step 1216, a simple lookup table is constructed containing two sets of columns: one containing the model parameters: distance to layer boundary (which can be negative or positive depending on whether the boundary is above or below the tool respectively), velocity of layer containing the tool, velocity of the nearby layer; the other set containing the predicted phase, amplitude, and average travel time measurements for each transmitter receiver spacing. Upon receiving an observed measurement through the mud pulse telemetry, a line-by-line search of the lookup table is employed to find the two layer model whose predicted measurements most closely match the observed measurements. Moreover, more efficient search algorithms can be employed which first compute the velocity of the layer containing the tool using the measurements corresponding to the shortest transmitter receiver spacings and then search only the corresponding (shorter) portion of the table. Similar table constructions and search algorithms can be made for formation models with more than two layers.

According to another example, a gradient search algorithm is used in step 1216. The search algorithm is analogous to that proposed in U.S. Pat. No. 6,594,584, incorporated herein by reference, and makes use of (a) an initial model (for example, a two layer model whose velocities could be computed from the measurements corresponding to the shortest transmitter receiver spacings), (b) the projection of the well trajectory onto the current model, (c) the computation of the predicted measurements along the well trajectory, (d) a comparison between the predicted and observed measurements, (e) the adjustment of the model parameters according to the results of a line search algorithm, and finally (f) returning to step (b) until there is a close agreement between the predicted and observed measurements. Instead of employing resistivity measurements as described in U.S. Pat. No. 6,594,584, the directional refraction measurements are employed as described herein. It is to be noted that when processing these refraction measurements while drilling the well, the initial model could be defined based on the model computed by the previous gradient search algorithm processing procedure using measurements acquired earlier through the mud-pulse telemetry system.

According to yet another example, a Markov Chain Monte Carlo algorithm is used in step 1216 which is similar to that described in U.S. Patent Appl. Publ. No. US20070168133, incorporated herein by reference. The algorithm is employed to convert the directional refraction measurements into a model of the subsurface consisting of the following steps: (a) an initial layered model is constructed either from the model computed using previous measurements or from a prior model; (b) a perturbed model is then constructed from the current model (by randomly perturbing either the position of a randomly chosen layer boundary or the velocity of a randomly chosen layer); (c) the predicted measurements are computed based on the perturbed model and compared to the observed measurements; (d) using a Metropolis decision rule, the algorithm decides whether to replace the current model with the perturbed model; (e) the current model is then recorded; (f) the algorithm returns to step (b) and is repeated for a predetermined number of iterations. Subsequently, a specialized visualization procedure that accounts for the variability in the list of recorded models is used to display a structural model of the formation that is in agreement with the measurements acquired along the well trajectory.

Figure 13:
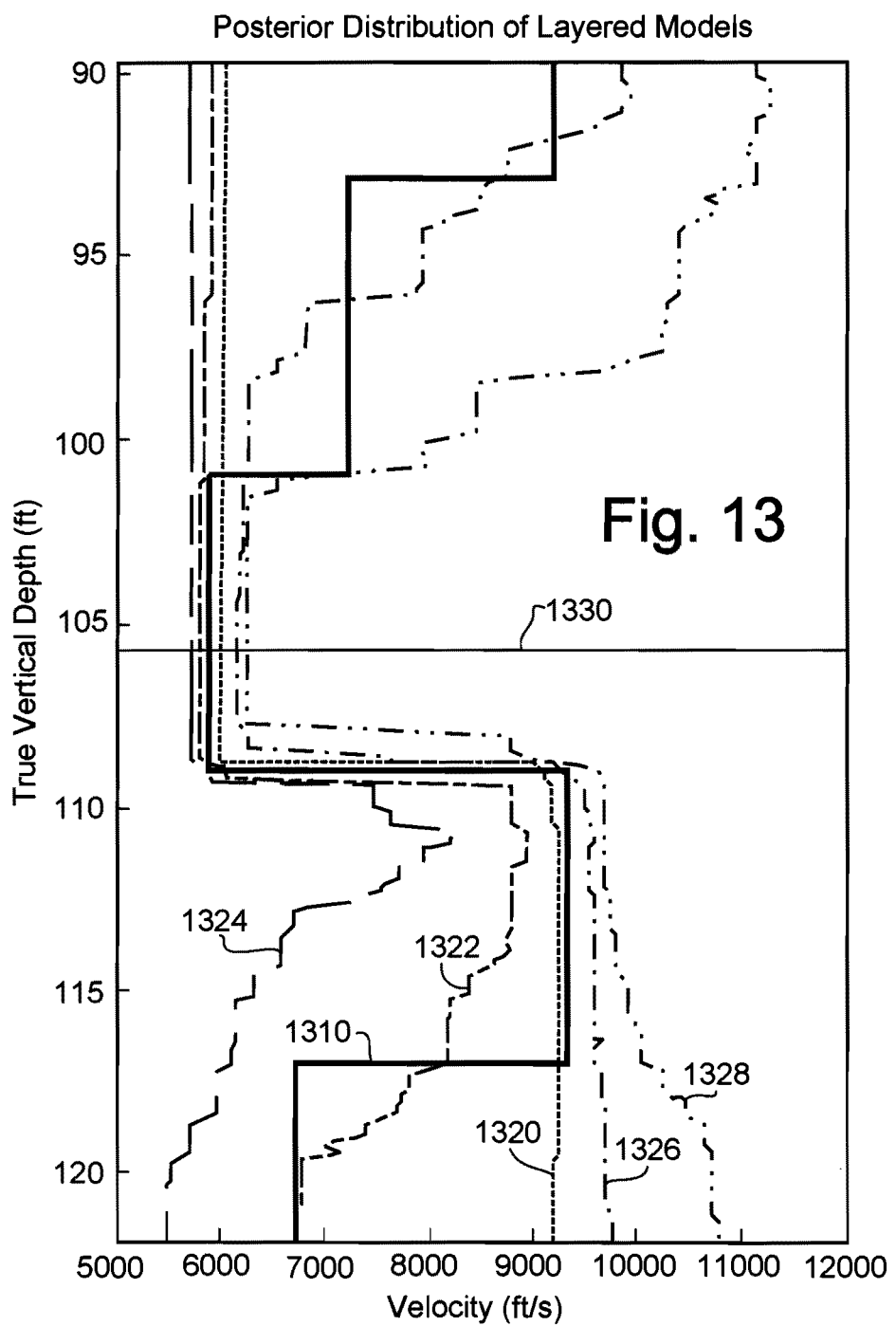
FIG. 13 is an example of a display for directional refraction measurement data.

FIG. 13 is an example of a display for the list of recorded models chosen using the directional refraction measurement data as described above. In particular, FIG. 13 is an example of a plot showing the posterior distribution of layered models in connection with a Markov Chain Monte Carlo algorithm as described above. In FIG. 13, the directional refraction measurements are used to image formation layers (and their velocities) near the measurement device. The measurement device configuration consisted of two receiver arrays with 12 receivers spaced 4 inches apart whose transmitter receiver spacings were 7 feet and 30 feet respectively. A synthetic formation model was used for this example and is shown by line 1310. The formation had layer boundaries at true vertical depths of 93, 101, 109, and 117 feet with corresponding layer velocities of 2800, 2200, 1800, 2850, and 2050 meters/second, as can be seen by line 1310. The depth of the tool in the example shown in FIG. 13 is shown by line 1330 and was 105.75 ft true vertical depth. The best estimate based on the inversion of the formation velocity is shown by line 1320. The 15% and 85% confidence intervals are shown by lines 1322 and 1326. The 5% and 95% confidence intervals are shown by lines 1324 and 1328. From the plots shown in FIG. 13 it can be seen that the inversion is able to determine the velocity of the layer containing the tool—that is, the layer from 101 to 109 feet. Additionally, when the velocity of a nearby formation layer has a greater velocity, the inversion is also able to resolve the nearby formation layer's boundary position and velocity. In the example of FIG. 13, the location and velocity of the layer with boundary at 109 ft are accurately predicted.

Figure 14:
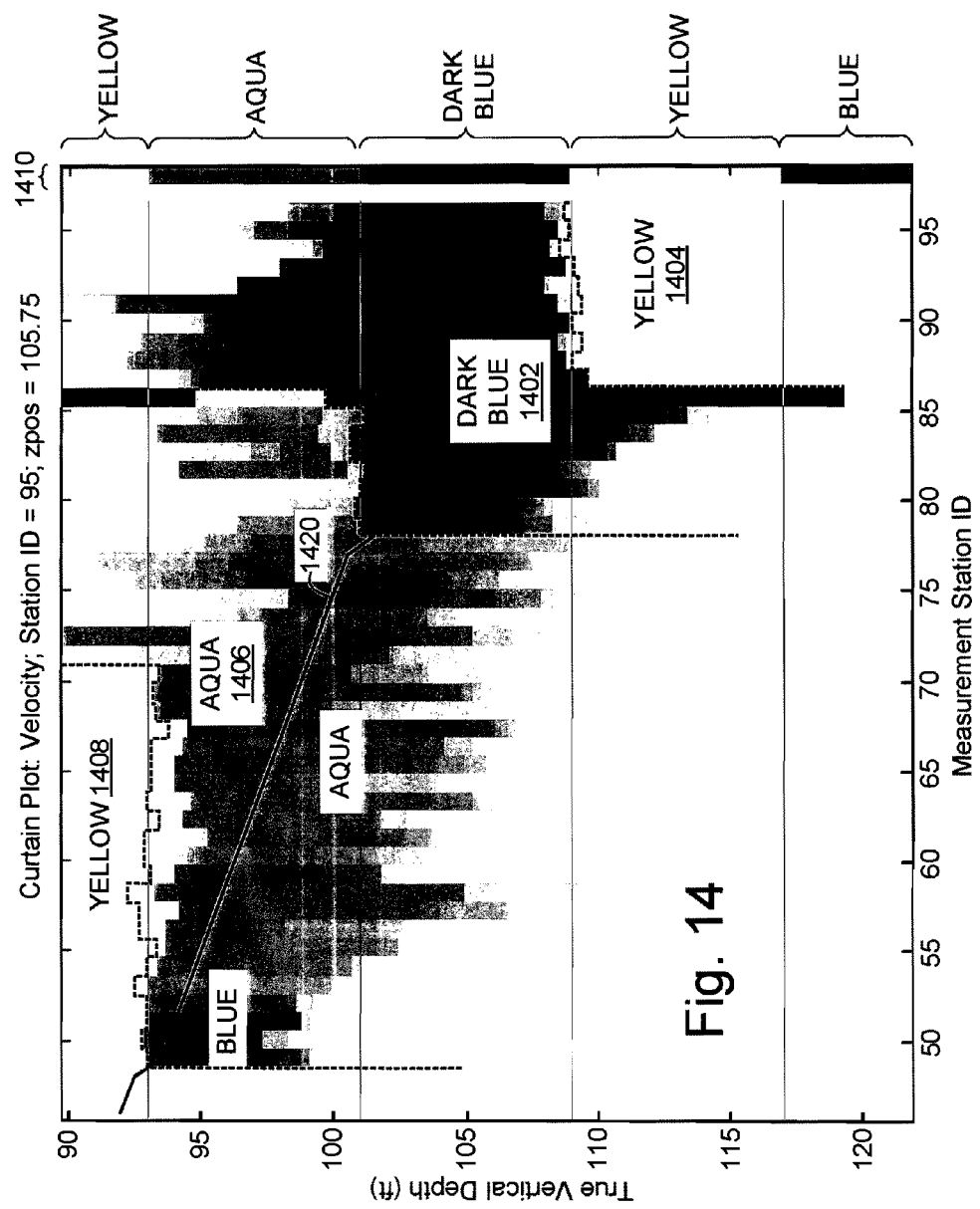
FIG. 14 is an example of a curtain plot showing velocity and confidence as a function of true vertical depth for each measurement station ID.

FIG. 14 is an example of a curtain plot showing velocity and confidence as a function of true vertical depth for each measurement station ID. In FIG. 14, the hue represents the estimated velocity according to the legend shown in FIG. 16b, and the saturation represents the confidence level of the estimate. Increased saturation represents greater confidence and decreased saturation represents lesser confidence in the velocity estimate. Further details of such plots are described in co-pending application US20070168133. As the figures herein are in black and white, labels as to the hues have been inserted. As can be seen from FIG. 16b, yellow represents about 2800-2900 m/sec, aqua represents about 2200-2400 m/sec, blue represents about 1900-2200 m/sec and dark blue represents about 1600-1900 m/sec. Referring again to FIG. 14, line 1420 represents the location of the tool for each particular measurement station. Legend 1410 shows the hues that represent the velocity at each layer of the synthetic formation, which is the same as that shown and described with respect to FIG. 13. As can be seen by the increased saturation close to line 1420, the greatest confidence are at locations close the tool. When the tool is at the depth above 93 feet (measurement stations 46-48), in the yellow region 1408, the inversion of the refracted data does not accurately detect the presence of the lower velocity layer immediately below. However, at measurement stations 49-71 where the tool is within the aqua region 1406, the refracted data can accurately detect the presence of the higher velocity layer above 93 feet. Similarly, although the lower velocity region 1402 shown in dark blue below 101 feet, is not detected from data from measurement stations 70-78, the high velocity region 1406 is detected by data from measurement stations 79-85, since the velocity is greater than the velocity where the measurements were made. The higher velocity layer shown by region 1404 in yellow below 109 feet is accurately detected from data from measurement stations 87-96.

Figure 15:
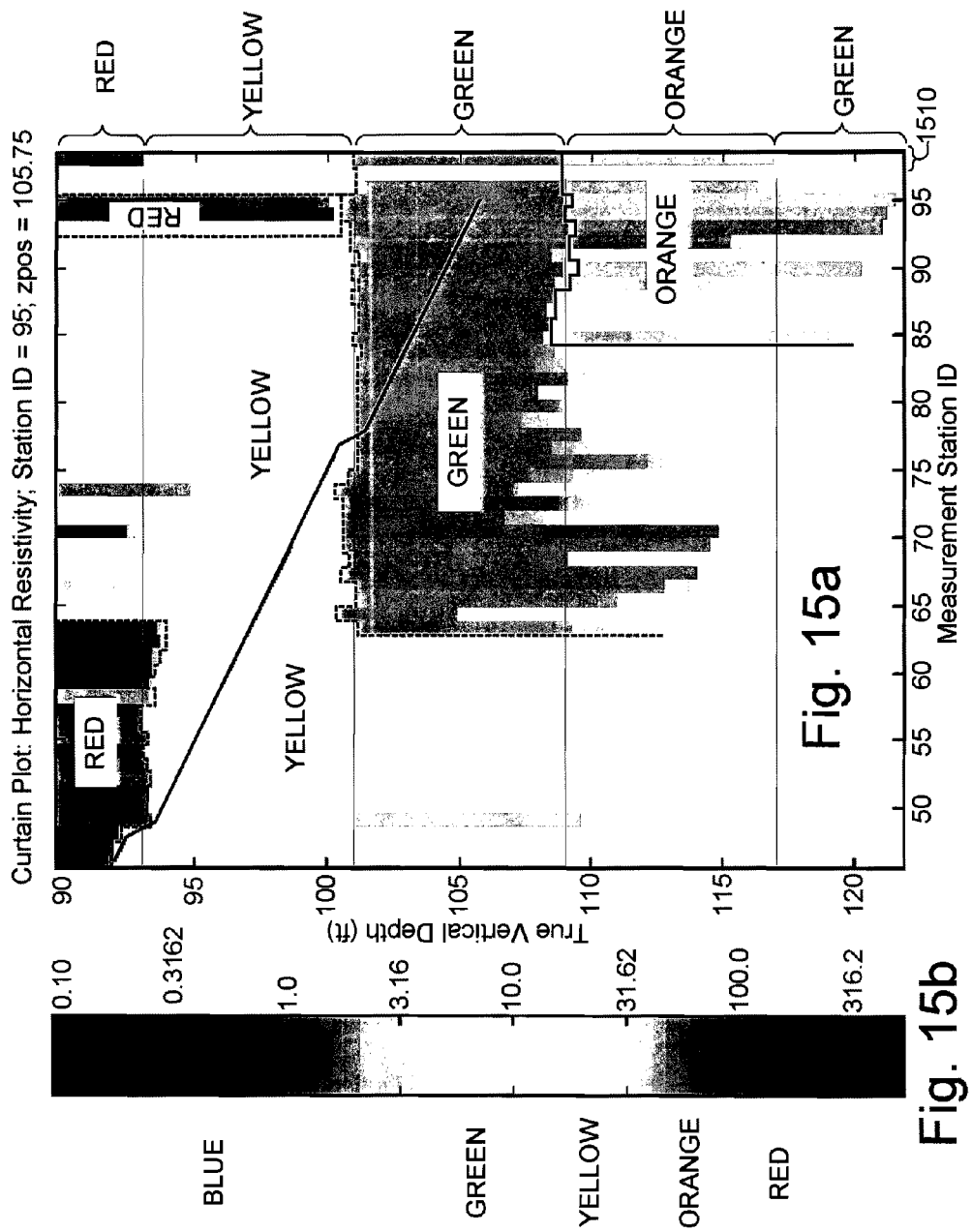

According to another example, at the surface, the refraction measurements as describe herein can be paired with directional electromagnetics measurements also acquired while drilling in real time through the mud-pulse telemetry system to provide for determining both the resistivities and velocities of formation layers above and below these measurement devices. FIG. 15*a* is a curtain plot showing horizontal resistivity at various depths for each measurement station. The synthetic formation model that is shown and described with respect to FIGS. 13-14 also has layer horizontal resistivities 85, 20, 6, 45, and 12.7 ohm-meters, listed for formation layers with increasing true vertical depth. FIG. 15*a* is a visualization of inversion results obtained using the Markov Chain Monte Carlo algorithm described above when applied to the directional refraction as well as directional electromagnetics measurements for the synthetic model. As with FIG. 14, in FIG. 15*a*, the hues represent the estimated resistivity values and the saturation represents the confidence in the value. The hues corresponding to the resistivity values are shown in legend 1510 for each layer of the synthetic formation. FIG. 15*b* is a legend showing resistivity values that correspond to hues as shown in FIG. 15*a*.

Figure 16:
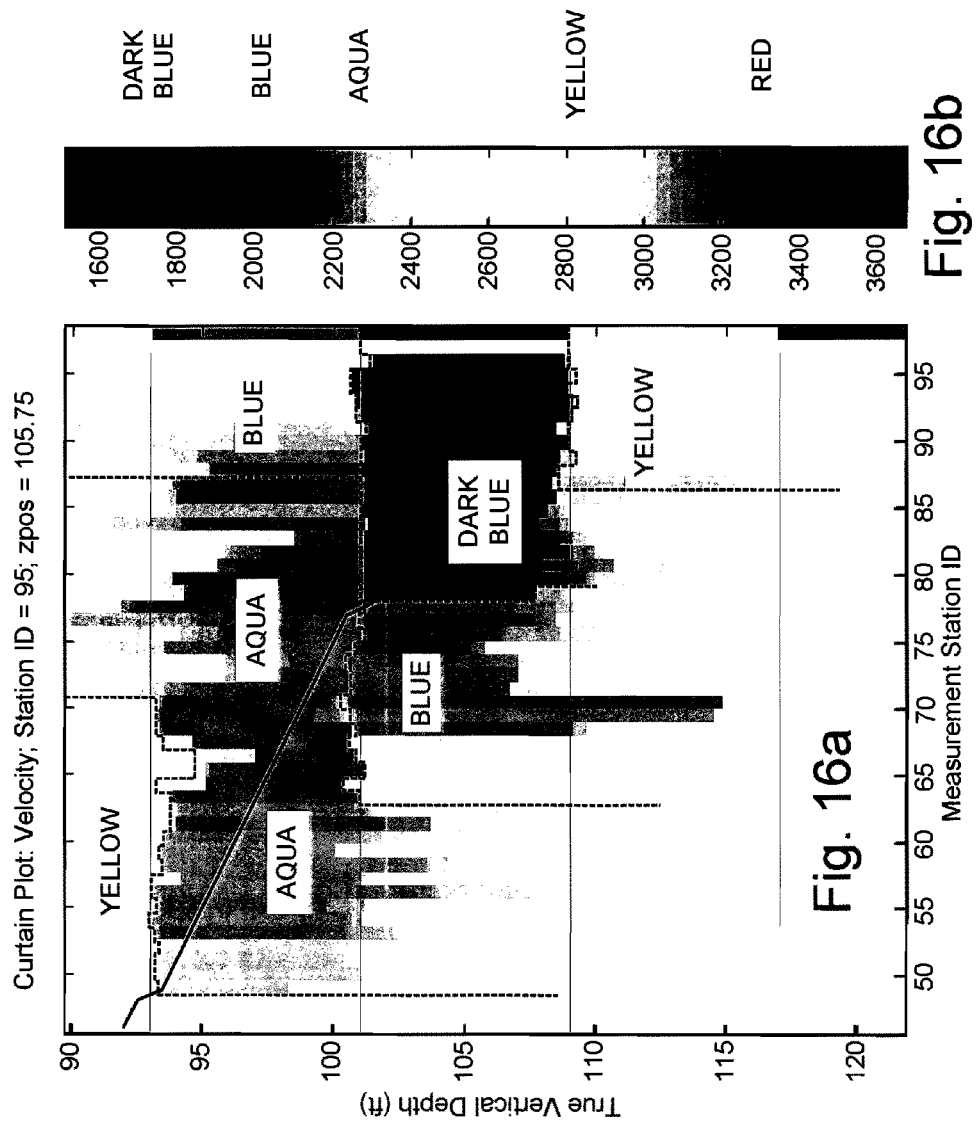

FIG. 16*a* is a curtain plot based on a joint inversion of refracted acoustic and electromagnetics measurements showing compressional velocity at various depths for each measurement station. As noted with respect to FIG. 14, for measurement stations 70 through 78, the inversion indicated that the measurements could not resolve the layer below the tool whose velocity was 1800 meters/second, since the velocity of the layer containing the tool was higher (2200 meters/second). Here in FIG. 16*a*, during measurement stations 64 through 78, the joint inversion indicates that the formation layer below the tool has a lower velocity than the layer containing the tool. This additional information is produced because the formation layer boundary is detected by the inversion due to the constraints of the EM measurements, and because no refraction event corresponding to the layer boundary is found in the refraction measurements. FIG. 16*b* is a legend showing velocity values that correspond to the hues as shown in FIGS. 14 and 16*a*.

Further detail will now be provided relating to the effect of formation dip on variation amplitudes of first arrival times. It has been found that when the formation dip relative to the nearby formation layers is given by $\phi$ (with 90 degrees corresponding to a well parallel to the nearby formation layer boundaries), that the time of first arrival at an array of azimuthally distributed receivers is given by $$T(\alpha) = T + A(v_f, v_{Near}, v_{Far}, \phi)\sin(\alpha - \beta) \qquad (16)$$

where:

$$A(v_f, v_{Near}, v_{Far}, \phi) = \qquad (17)$$

$$\left(\left(\frac{\sin\left(\phi - \frac{\pi}{2}\right)}{v_{Near}\cos\theta_0} + \frac{\cos\left(\phi - \frac{\pi}{2}\right) - \tan\theta_0 \sin\left(\phi - \frac{\pi}{2}\right)}{v_{FAR}}\right)\tan\tilde{\theta}_1 - \frac{1}{v_f \cos\tilde{\theta}_1}\right) r_{tool}$$

Here the angle of refraction at the nearby formation layer boundary is $\theta_0$ and the angle of incidence with respect to the borehole wall $\theta_1$ is thus given by $$\theta_1 = \theta_0 + \phi - \frac{\pi}{2}.$$

$\tilde{\theta}_1$ is the incidence angle at the azimuthally distributed array of receivers and is computed via:

$$\sin\tilde{\theta}_1 = \frac{v_f}{v_{Near}}\sin\theta_1 \qquad (18)$$

When the well is highly deviated and $\phi$ is approximately 90 degrees, the amplitude described in Equation (17) is very well approximated by the amplitude computed in Equation (7) where the wellbore and formation boundary are parallel. This is because $$\sin\left(\phi - \frac{\pi}{2}\right) \approx 0$$

and $$\cos\left(\phi - \frac{\pi}{2}\right) \approx 1.$$

Figure 17:
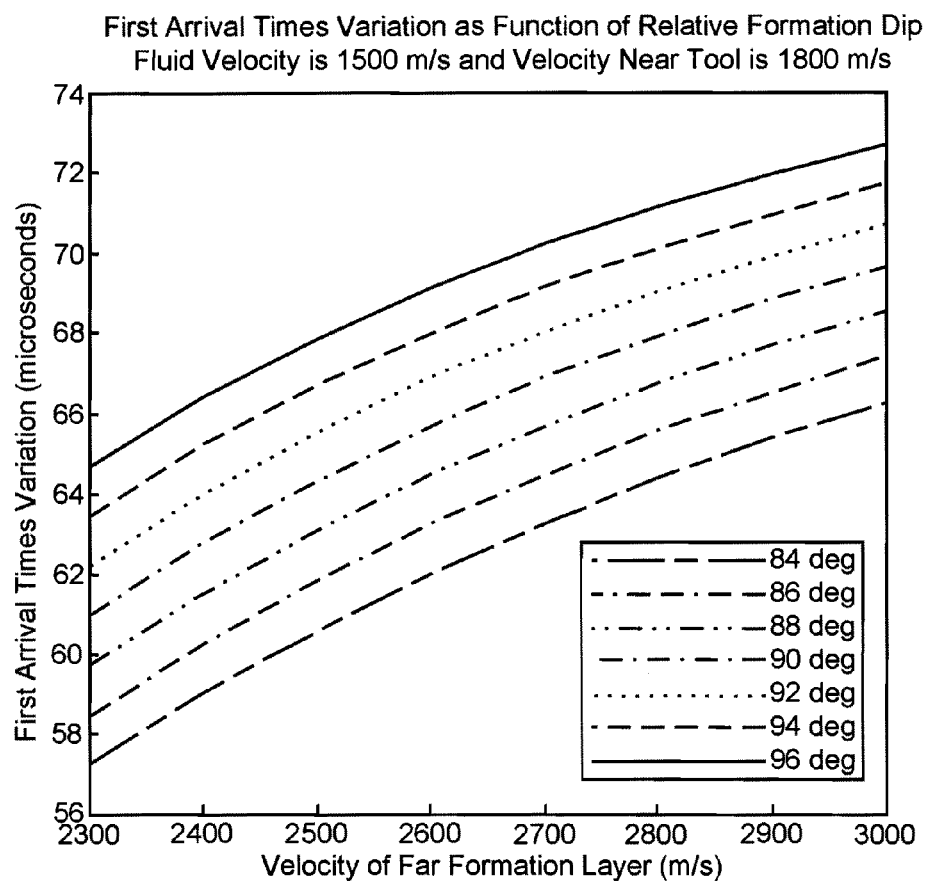
FIG. 17 is a graph showing the size of the variation in the first arrival times as a function of the relative formation dip and the velocity of the nearby formation layer.

FIG. 17 is a graph showing the size of the variation in the first arrival times as a function of the relative formation dip and the velocity of the nearby formation layer $v_{FAR}$. As can be seen in FIG. 17, the deviation of these arrival times from the case where the relative formation dip is 90 degrees is less than 4 microseconds.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for measuring and analyzing refracted acoustic energy comprising:
a plurality of receivers mounted at a plurality of azimuths around the circumference of a downhole tool, the receivers being arranged to receive refracted acoustic energy from a downhole formation, wherein the refracted acoustic energy is responsive to acoustic energy transmitted from an acoustic source located coaxially with the plurality of receivers, and wherein the refracted acoustic energy is received using one or more of the receivers positioned offset from an axis of the downhole tool; and
an analysis system in communication with the receivers and programmed to analyze measurements of the refracted acoustic energy to estimate information relating to an azimuthal direction relative to the downhole tool of an interface within the downhole formation, wherein the measurements of the refracted acoustic energy comprise arrivals times of the refracted acoustic energy at the plurality of receivers as a function of the plurality of azimuths of the receivers around the circumference of the downhole tool.

2. A system according to claim 1 wherein at least some of the receivers are positioned in an azimuthally distributed arrangement such that the analysis system can estimate the azimuthal direction from which the refracted acoustic energy is arriving.

3. A system according to claim 2 wherein the analysis system estimates the azimuthal direction from which the refracted acoustic energy is arriving based at least in part on variations in arrival times of the refracted acoustic energy for the respective azimuthally distributed receivers.

4. A system according to claim 1 wherein the information relating to the azimuthal direction relative to the downhole tool includes a distance between the downhole tool and the interface measured perpendicular to the axis of the downhole tool.

5. A system according to claim 1 wherein the information relating to the azimuthal direction relative to the downhole tool includes a vector position of the interface relative to the downhole tool.

6. A system according to claim 1, wherein a first region has a substantially lower sonic velocity than that of a second region.

7. A system according to claim 6, wherein the analysis system is further programmed to estimate a sonic velocity of the second region based at least in part on the analyzed measurements.

8. A system according to claim 1 wherein the plurality of receivers are further mounted and arranged into a plurality of receiver stations, wherein each receiver station includes a plurality of receivers having substantially the same axial position on the downhole tool and the receivers of each receiver station being positioned in an azimuthally distributed arrangement.

9. A system according to claim 1 further comprising:
a downhole processing system arranged and programmed to calculate one or more parameters based on the received refracted acoustic energy; and
a telemetry system for transmitting the one or more parameters to a surface system.

10. A system according to claim 9 wherein the telemetry system is a mud-pulsed based telemetry system.

11. A system according to claim 9 wherein the parameters include at least three parameters representing a sinusoid from the first arrival times of the refracted acoustic energy calculated using a method selected from the group consisting of a linear least-squares procedure and a coherence analysis approach.

12. A system according to claim 11 wherein the at least three parameters include amplitude, phase, and average travel time.

13. A system according to claim 1 wherein the analysis system is programmed to perform a refraction tomography inversion based at least in part on the receiver measurements to estimate the information relating to the azimuthal direction of the interface.

14. A system according to claim 13 wherein the refraction tomography inversion is based in part on electromagnetic resistivity measurements of the formation.

15. A system according to claim 1 wherein the downhole tool is a sonic tool conveyed on a wireline.

16. A system according to claim 1 wherein the downhole tool is a logging-while-drilling module housed within a drill collar.

17. A system according to claim 16 wherein the drill collar has steering capability and wherein a trajectory of drilling can be altered based at least in part on the estimated information relating to the azimuthal direction of the interface.

18. A system according to claim 1 further comprising the acoustic energy source mounted on the downhole tool and adapted and positioned to transmit acoustic energy into the formation.

19. A system according to claim 1 wherein the analysis system estimates the azimuthal direction from which the refracted acoustic energy is arriving by analyzing measurements taken by the receivers while located at different azimuthal positions due to rotation of a drill collar on which the receivers are mounted.

20. A method for measuring and analyzing refracted acoustic energy comprising:
receiving refracted acoustic energy from a downhole formation using a downhole tool, wherein the refracted acoustic energy is responsive to acoustic energy transmitted from an acoustic source located coaxially with a plurality of receivers mounted at a plurality of azimuths around the circumference of the downhole tool, wherein the refracted acoustic energy is received using one or more of the receivers positioned offset from an axis of the downhole tool; and
estimating an azimuthal direction relative to the downhole tool of an interface within the downhole formation, the estimation being based at least in part on measurements of the received refracted acoustic energy, wherein the measurements of the received refracted acoustic energy comprise arrivals times at the plurality of receivers as a function of the plurality of azimuths of the receivers around the circumference of the downhole tool.

21. A method according to claim 20 wherein the one or more receivers include a plurality receivers positioned in an azimuthally distributed arrangement each offset from the axis of the downhole tool, and wherein the estimation of azimuthal direction is based at least in part on variations in the arrival times of the refracted acoustic energy for the respective azimuthally distributed receivers.

22. A method according to claim 21 wherein the receivers are mounted and arranged into a plurality of receiver stations, wherein each receiver station includes a plurality of receivers having substantially the same axial position on the downhole tool and the receivers of each receiver station being positioned in an azimuthally distributed arrangement.

23. A method according to claim 20 wherein the estimation of azimuthal direction is based at least in part on measurements taken by the one or more receivers while located at different azimuthal positions due to rotation of the drill collar.

24. A method according to claim 20 further comprising estimating a distance between the downhole tool and the interface measured perpendicular to the axis of the downhole tool.

25. A method according to claim 20 further comprising estimating a vector position of the interface relative to the downhole tool.

26. A method according to claim 20 wherein a first region has a substantially lower sonic velocity than that of a second region.

27. A method according to claim 26 further comprising estimating a sonic velocity of the second region based at least in part on the received refracted acoustic energy.

28. A method according to claim 20 further comprising:
computing downhole one or more parameters based on the received refracted acoustic energy; and
transmitting the one or more parameters to a surface system.

29. A method according to claim 28 wherein a mud pulse telemetry system is used to transmit the one or more parameters to the surface system.

30. A method according to claim 28 wherein the one or more parameters include at least three parameters representing a sinusoid from first arrival times of the refracted acoustic energy computed using a method selected from the group consisting of a linear least-squares procedure and a coherence analysis approach.

31. A method according to claim 30 wherein the at least three parameters include amplitude, phase, and average travel time.

32. A method according to claim 20 wherein the estimation of the azimuthal direction includes performing a refraction tomography inversion based at least in part on the received refracted acoustic energy.

33. A method according to claim 32 wherein the refraction tomography inversion is based in part on electromagnetic resistivity measurements of the formation.

34. A method according to claim 20 wherein the downhole tool is a sonic tool conveyed on a wireline.

35. A method according to claim 20 wherein the downhole tool is a logging-while-drilling module housed within a drill collar.

36. A method according to claim 35 wherein the drill collar has steering capability and the method further comprising altering a trajectory of drilling based at least in part on the estimated azimuthal direction of the interface.

37. A method according to claim 20 further comprising transmitting acoustic energy into the formation.

38. A system for controlling a drilling operation comprising:
at least one receiver mounted on a downhole tool within a drill collar, the receiver being arranged to receive refracted acoustic energy from a downhole formation, wherein the refracted acoustic energy is responsive to acoustic energy transmitted from an acoustic source located coaxially with the at least one receiver, the at least one receiver being offset from an axis of the downhole tool;
an analysis system in communication with the receiver and programmed to analyze measurements of the refracted acoustic energy to estimate an azimuthal direction of an interface within the formation relative to the downhole tool, and a distance between the downhole tool and the interface, wherein the measurements of the refracted acoustic energy comprise arrival times of the refracted acoustic energy as a function of azimuth of the at least one receiver; and
a steering system configured to maintain or alter a drilling trajectory based at least in part on the estimated azimuthal direction.

39. A system according to claim 38 wherein the analysis system is configured to estimate the azimuthal direction from which the refracted acoustic energy is arriving by analyzing measurements taken by the at least one receiver while located at different azimuthal positions due to rotation of a drill collar.

40. A system according to claim 39 wherein the analysis system estimates the azimuthal direction from which the refracted acoustic energy is arriving based at least in part on variations in arrival times of the refracted acoustic energy received at the different azimuthal positions.

41. A system according to claim 38 wherein a first region has a substantially lower sonic velocity than that of a second region.

42. A system according to claim 41 wherein the analysis system is further programmed to estimate thea sonic velocity of the second region based at least in part on the analyzed measurements.

43. A system according to claim 38 wherein the at least one receiver is a plurality of receivers mounted and arranged around the circumference of the downhole tool.

44. A system according to claim 38 further comprising:
a downhole processing system arranged and programmed to calculate one or more parameters based on the received refracted acoustic energy; and
a telemetry system for transmitting the one or more parameters to a surface system.

45. A system according to claim 44 wherein the telemetry system is a mud-pulsed based telemetry system.

46. A system according to claim 45 wherein the parameters include at least three parameters representing a sinusoid from first arrival times of the refracted acoustic energy calculated using a method selected from the group consisting of a linear least-squares procedure and a coherence analysis approach.

47. A system according to claim 46 wherein the at least three parameters include amplitude, phase, and average travel time.

48. A system according to claim 38 wherein the analysis system is programmed to perform a refraction tomography inversion based at least in part on the receiver measurements to estimate the information relating to the formation.

49. A system according to claim 48 wherein the refraction tomography inversion is based in part on electromagnetic resistivity measurements of the formation.

50. A system according to claim 38 further comprising the acoustic energy source mounted on the downhole tool and positioned to transmit acoustic energy into the formation.

51. A method for controlling a drilling operation comprising:
receiving refracted acoustic energy from a downhole formation using a downhole tool within a drill collar, wherein said refracted energy is responsive to acoustic energy transmitted from an acoustic source located coaxially with a plurality of receivers in the downhole tool, the receivers being offset from an axis of the downhole tool;
estimating an azimuthal direction of an interface within the formation relative to the downhole tool, and a distance between the downhole tool and the interface, based at least in part on the received refracted acoustic energy, wherein the received refracted acoustic energy comprises arrivals times of the refracted acoustic energy at the receivers as a function of azimuth of the receivers; and
steering the drilling trajectory based at least in part on the estimated azimuthal direction.

52. A method according to claim 51 wherein the refracted acoustic energy is received using the receivers located at different azimuthal positions due to rotation of the drill collar.

53. A method according to claim 52 wherein the estimated azimuthal direction is estimated based at least in part on variations in arrival times of the refracted acoustic energy received at the different azimuthal positions.

54. A method according to claim 51 wherein a first region has a substantially lower sonic velocity then that of a second region.

55. A method according to claim 54 further comprising estimating a sonic velocity of the second region based at least in part on the received refracted acoustic energy.

56. A method according to claim 51 where the refracted acoustic energy is received from the plurality of receivers mounted and arranged into a plurality of receiver stations at different positions along the length of the downhole tool.

57. A method according to claim 51 further comprising:
computing downhole one or more parameters based on the received refracted acoustic energy; and
transmitting the one or more parameters to a surface system.

58. A method according to claim 57 wherein a mud pulse telemetry system is used to transmit the one or more parameters to the surface system.

59. A method according to claim 58 wherein the one or more parameters include at least three parameters representing a sinusoid from first arrival times of the refracted acoustic energy computed using a method selected from the group consisting of a linear least-squares procedure and a coherence analysis approach.

60. A method according to claim 59 wherein the at least three parameters include amplitude, phase, and average travel time.

61. A method according to claim 51 wherein the estimation of the azimuthal direction includes performing a refraction tomography inversion based at least in part on the received refracted acoustic energy.

62. A method according to claim 61 wherein the refraction tomography inversion is based in part on electromagnetic resistivity measurements of the formation.

63. A method according to claim 51 further comprising transmitting acoustic energy into the formation.

* * * * *

UNITED STATES PATENT AND TRADEMARK OFFICE
CERTIFICATE OF CORRECTION

PATENT NO. : 8,813,869 B2
APPLICATION NO. : 12/052503
DATED : August 26, 2014
INVENTOR(S) : Nicholas Bennett et al.

It is certified that error appears in the above-identified patent and that said Letters Patent is hereby corrected as shown below:

Title Page, item (75),

The fourth inventor's family name should be corrected as follows.

Correct: Nobuyasu HIRABAYASHI

Incorrect: Nobuyasu HIRABAYASBI

Signed and Sealed this
Nineteenth Day of May, 2015

Michelle K. Lee
*Director of the United States Patent and Trademark Office*